(12) United States Patent
Clark et al.

(10) Patent No.: US 8,316,602 B2
(45) Date of Patent: Nov. 27, 2012

(54) PORTABLE TABLE CONSTRUCTION AND METHOD FOR MAKING THE SAME

(75) Inventors: Roger A. Clark, Milwaukee, WI (US); George Gula, Verona, PA (US)

(73) Assignee: PS Furniture, Inc., Nashville, TN (US)

( * ) Notice: Subject to any disclaimer, the term of this patent is extended or adjusted under 35 U.S.C. 154(b) by 63 days.

(21) Appl. No.: 12/830,640

(22) Filed: Jul. 6, 2010

(65) Prior Publication Data

US 2011/0000405 A1   Jan. 6, 2011

Related U.S. Application Data

(63) Continuation-in-part of application No. 12/419,127, filed on Apr. 6, 2009, now Pat. No. 7,748,196, which is a continuation-in-part of application No. 12/142,769, filed on Jun. 19, 2008, now Pat. No. 7,698,872, which is a continuation of application No. 11/564,075, filed on Nov. 28, 2006, now Pat. No. 7,401,442.

(51) Int. Cl.
  *E04C 1/00* (2006.01)
(52) U.S. Cl. ............... 52/309.1; 108/150; 108/161
(58) Field of Classification Search ............. 52/309.1; 108/150, 161
See application file for complete search history.

(56) References Cited

U.S. PATENT DOCUMENTS

| | | |
|---|---|---|
| 2,490,577 A | 12/1949 | Brown |
| 2,849,758 A | 9/1958 | Plumley et al. |
| 2,907,127 A | 10/1959 | Waugh et al. |
| 2,911,274 A | 11/1959 | Grube |
| 3,310,919 A | 3/1967 | Bue et al. |
| 3,323,797 A | 6/1967 | Horton, Jr. |
| 3,450,593 A | 6/1969 | Fossier et al. |
| 3,512,324 A | 5/1970 | Reed |
| 3,567,260 A | 3/1971 | Norris |
| 3,582,447 A | 6/1971 | Stoiki |
| 3,630,813 A | 12/1971 | Allen |
| 3,676,279 A | 7/1972 | Beaver |
| 3,826,056 A | 7/1974 | Smith et al. |
| 3,868,297 A | 2/1975 | Jamison et al. |

(Continued)

FOREIGN PATENT DOCUMENTS

DE     298 09 543 U1     5/1998

OTHER PUBLICATIONS

Bayer MaterialScience NAFTA—Products—"Baypreg F Composite" webpage (printed at Mar. 28, 2007).

(Continued)

*Primary Examiner* — Mark Wendell
(74) *Attorney, Agent, or Firm* — Phillip E. Walker; Waddey & Patterson, P.C.

(57) ABSTRACT

Disclosed herein is a portable table having numerous favorable characteristics. The table comprises a tabletop, a column connection, and a column. The tabletop includes a core, a thickness, a perimeter section, and a bottom surface. The column connection is positioned within the thickness of the core and within the tabletop, and includes a flange and a cylindrical sleeve having a first fastener. The column includes an insertion end that includes a second fastener shaped to removably engage the first fastener and secure the column to the column connection. The insertion end is shaped to removably fit within the cylindrical sleeve of the column connection.

17 Claims, 26 Drawing Sheets

U.S. PATENT DOCUMENTS

| | | | |
|---|---|---|---|
| 3,982,057 A | | 9/1976 | Briggs et al. |
| 4,144,681 A | | 3/1979 | Leffler et al. |
| 4,353,659 A | * | 10/1982 | Comte .......................... 403/24 |
| 4,353,947 A | | 10/1982 | Northcutt |
| 4,411,118 A | | 10/1983 | Claver |
| 4,522,284 A | | 6/1985 | Fearon et al. |
| 4,603,531 A | | 8/1986 | Nash |
| 4,643,105 A | * | 2/1987 | Baum .......................... 108/150 |
| 4,645,171 A | | 2/1987 | Heide |
| 4,680,216 A | | 7/1987 | Jacaruso |
| 4,724,773 A | * | 2/1988 | Newberry et al. ............ 108/150 |
| 4,848,245 A | | 7/1989 | Piretti |
| 4,852,837 A | * | 8/1989 | Merten et al. ................. 248/188 |
| 4,879,152 A | | 11/1989 | Green |
| 4,905,611 A | * | 3/1990 | Jung-Chung ................... 108/90 |
| 4,910,067 A | | 3/1990 | O'Neill |
| 4,931,340 A | | 6/1990 | Baba et al. |
| 4,973,508 A | | 11/1990 | Bretz |
| 4,988,131 A | | 1/1991 | Wilson et al. |
| 5,006,391 A | | 4/1991 | Biersach |
| 5,026,010 A | | 6/1991 | Camarota |
| 5,061,541 A | | 10/1991 | Gertel |
| 5,070,662 A | | 12/1991 | Niese |
| 5,074,224 A | | 12/1991 | Stascheit |
| 5,154,963 A | | 10/1992 | Terry |
| 5,288,538 A | | 2/1994 | Spears |
| 5,341,749 A | | 8/1994 | Noakes |
| 5,348,778 A | | 9/1994 | Knipp et al. |
| 5,377,601 A | | 1/1995 | Cashen |
| 5,496,610 A | | 3/1996 | Landi et al. |
| 5,540,159 A | * | 7/1996 | Anderson .................... 108/150 |
| 5,569,508 A | | 10/1996 | Cundiff |
| 5,626,157 A | | 5/1997 | Galpin et al. |
| 5,634,309 A | | 6/1997 | Polen |
| 5,634,411 A | * | 6/1997 | Chasan ..................... 108/153.1 |
| 5,667,866 A | | 9/1997 | Reese, Jr. |
| 5,697,305 A | * | 12/1997 | Chasan et al. ................. 108/90 |
| 5,718,179 A | * | 2/1998 | Johnson et al. ............ 108/50.02 |
| 5,776,582 A | | 7/1998 | Needham |
| 5,794,545 A | | 8/1998 | McDaniel et al. |
| 5,823,121 A | * | 10/1998 | Reiter ..................... 108/147.19 |
| 5,888,612 A | | 3/1999 | Needham et al. |
| 5,934,630 A | | 8/1999 | Williams et al. |
| 5,947,037 A | | 9/1999 | Hornberger et al. |
| 5,972,468 A | | 10/1999 | Welch et al. |
| 5,992,112 A | | 11/1999 | Josey |
| 6,061,993 A | | 5/2000 | Bendixen et al. |
| 6,117,518 A | | 9/2000 | Cawse et al. |
| 6,128,881 A | | 10/2000 | Bue et al. |
| 6,182,583 B1 | * | 2/2001 | Larson ......................... 108/147 |
| 6,189,283 B1 | | 2/2001 | Bentley et al. |
| 6,227,515 B1 | | 5/2001 | Broyles |
| 6,235,367 B1 | | 5/2001 | Holmes et al. |
| 6,253,530 B1 | | 7/2001 | Price et al. |
| 6,446,413 B1 | | 9/2002 | Gruber |
| 6,455,131 B2 | | 9/2002 | Lopez-Anido et al. |
| 6,505,452 B1 | | 1/2003 | Hannig et al. |
| 6,526,710 B1 | | 3/2003 | Killen |
| 6,659,410 B1 | | 12/2003 | Lu |
| 6,743,497 B2 | | 6/2004 | Ueda et al. |
| 6,753,061 B1 | | 6/2004 | Wedi |
| 6,761,953 B2 | | 7/2004 | Haas et al. |
| 6,769,218 B2 | | 8/2004 | Pervan |
| 6,808,434 B1 | * | 10/2004 | Park .............................. 441/130 |
| 6,837,171 B1 | | 1/2005 | Clark et al. |
| 6,865,856 B2 | | 3/2005 | Kim et al. |
| 6,913,667 B2 | | 7/2005 | Nudo et al. |
| 7,004,082 B2 | * | 2/2006 | Yang ......................... 108/50.12 |
| 7,105,073 B2 | | 9/2006 | Crane |
| 7,197,852 B2 | | 4/2007 | Grillos |
| 7,543,540 B2 | * | 6/2009 | Tatematsu ..................... 108/192 |
| 7,748,196 B2 | | 7/2010 | Clark |
| 2006/0003155 A1 | | 1/2006 | Stewart |
| 2006/0165972 A1 | | 7/2006 | Chimelak et al. |
| 2006/0204714 A1 | | 9/2006 | Wang et al. |

OTHER PUBLICATIONS

Cageao, Ronald A., Bayer MaterialScience LLC, "Studies of Composites Made With Baypreg F: Component Selection for Optimal Mechanical Properties," Polyurethanes 2004, Oct. 18-20, 2004.

* cited by examiner

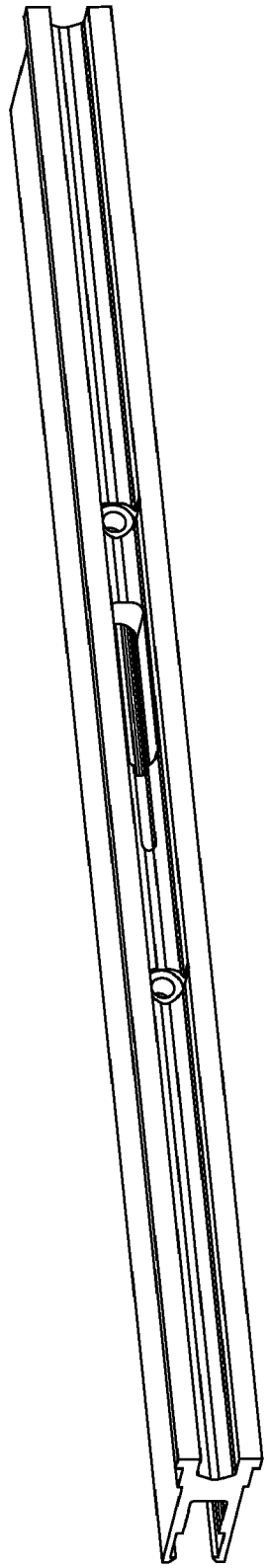
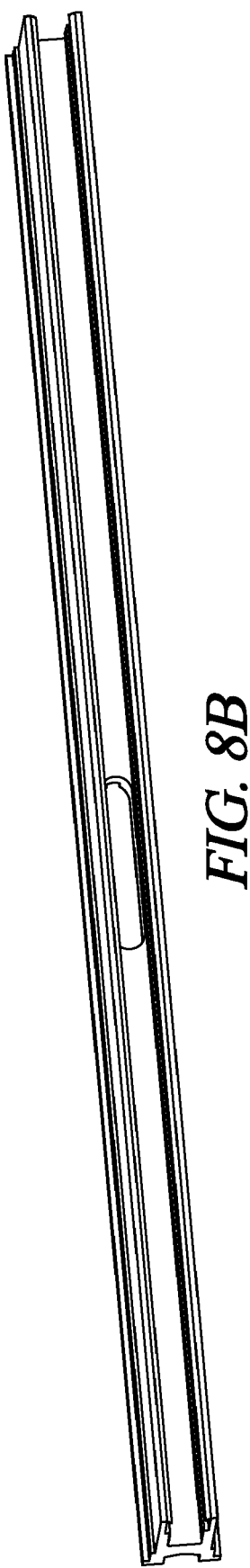
FIG. 8A
FIG. 8B

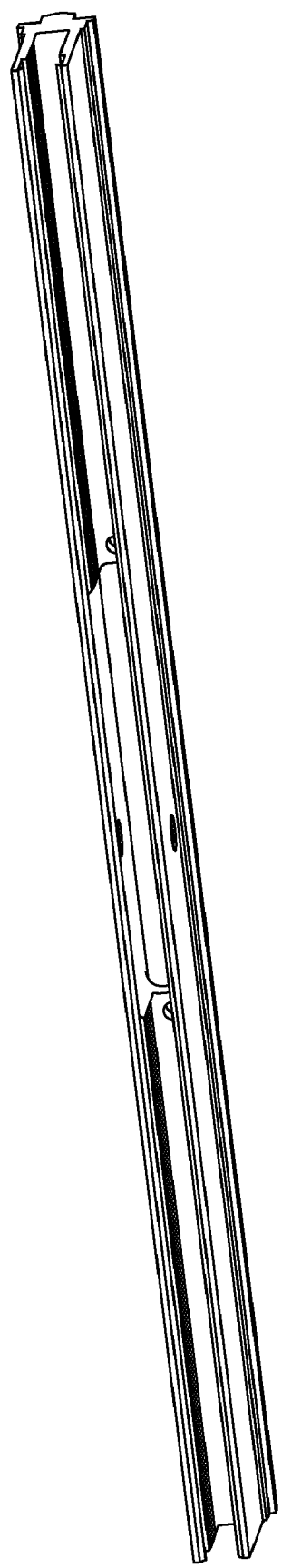
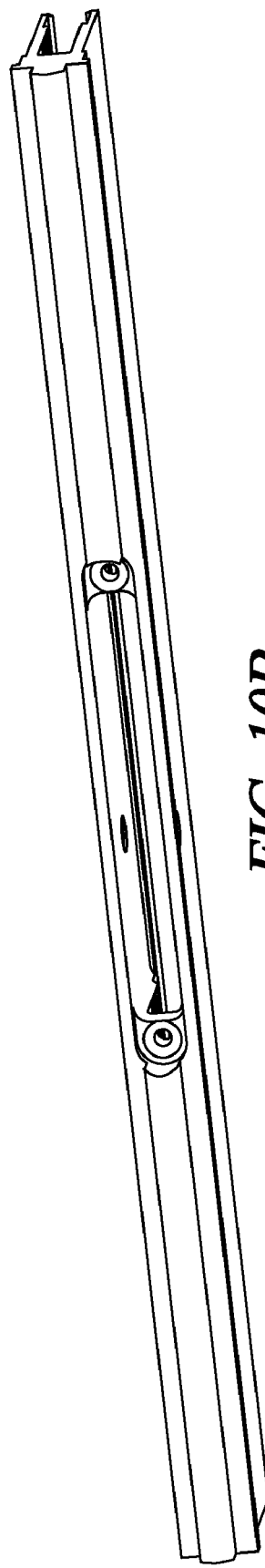
FIG. 10A
FIG. 10B

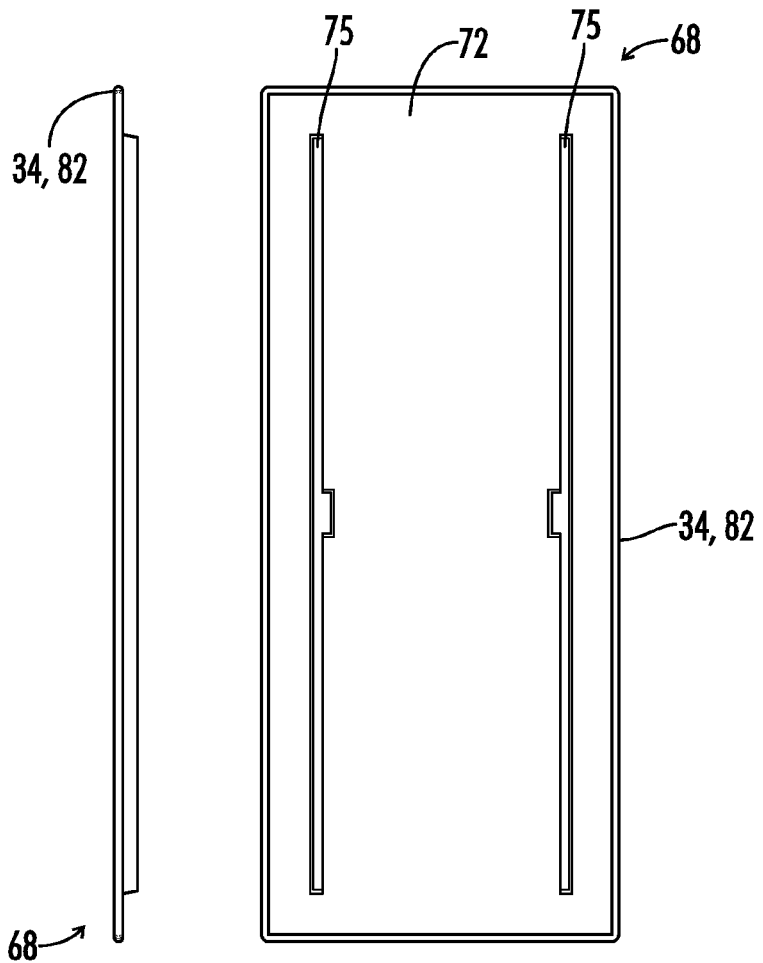
*FIG. 18A*  *FIG. 18B*
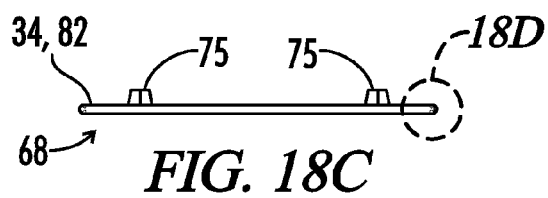
*FIG. 18C*
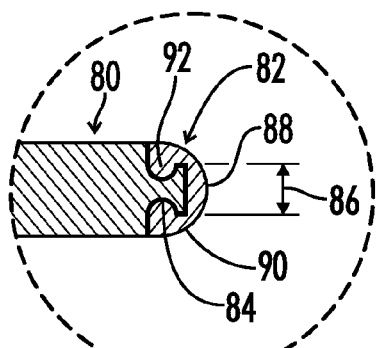
*FIG. 18D*

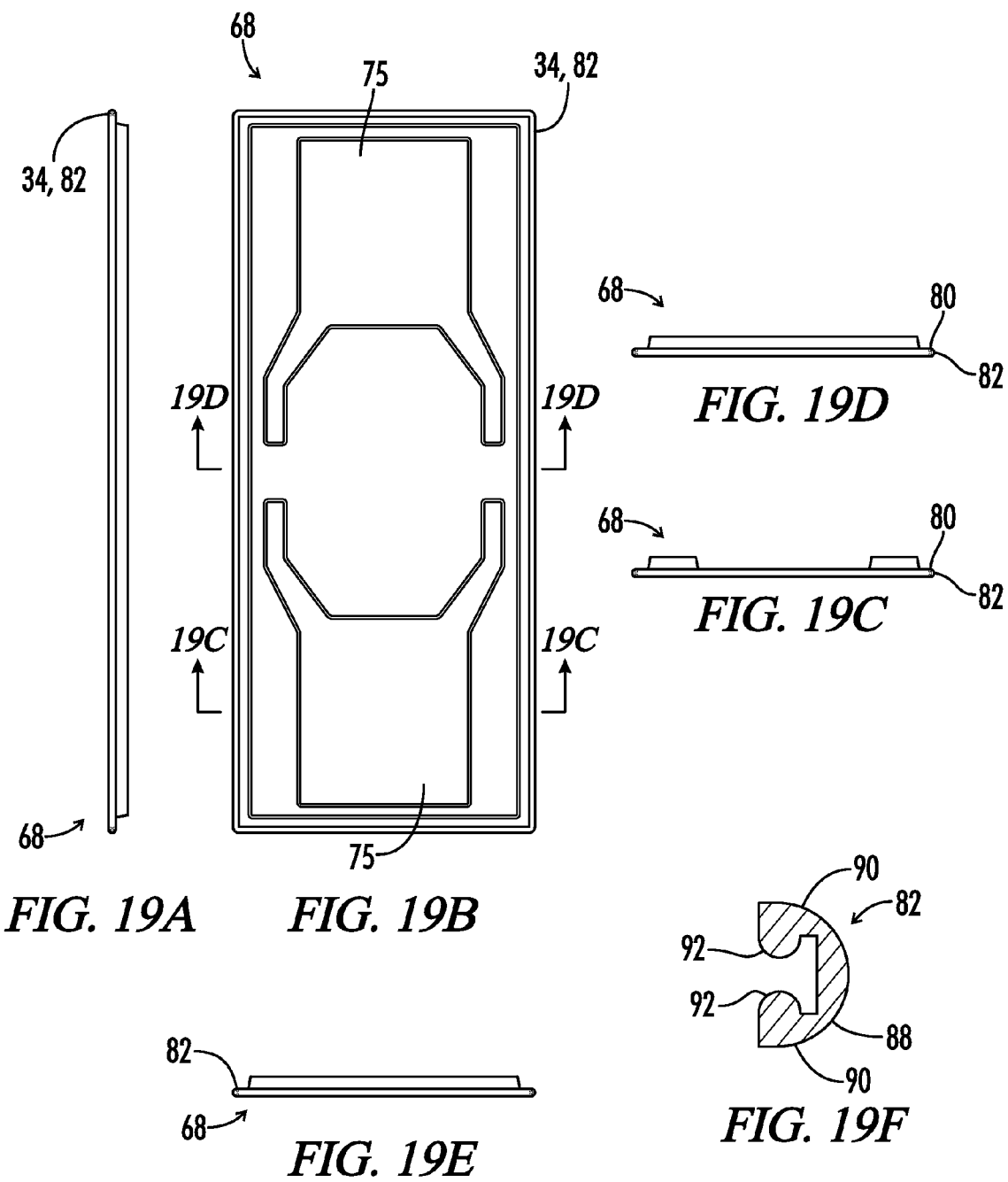

PORTABLE TABLE CONSTRUCTION AND METHOD FOR MAKING THE SAME

CROSS-REFERENCES TO RELATED APPLICATIONS

This application is a Continuation-in-part application claiming the benefit of U.S. patent application Ser. No. 12/419,127 filed Apr. 6, 2009, entitled "New Portable Panel Construction and Method for Making the Same", and will issued as U.S. Pat. No. 7,748,196 on Jul. 6, 2010, which claims benefit of U.S. patent application Ser. No. 12/142,769 filed Jun. 19, 2008, entitled "New Portable Panel Construction and Method for Making the Same", and issued as U.S. Pat. No. 7,698,872 on Apr. 20, 2010, which claims benefit of U.S. patent application Ser. No. 11/564,075 filed Nov. 28, 2006, entitled "New Portable Panel Construction and Method for Making the Same", and issued as U.S. Pat. No. 7,401,442 on Jul. 22, 2008, all of which are hereby incorporated in their entireties.

A portion of the disclosure of this patent document contains material that is subject to copyright protection. The copyright owner has no objection to the facsimile reproduction by anyone of the patent document or the patent disclosure, as it appears in the U.S. Patent and Trademark Office patent file or records, but otherwise reserves all copyright rights whatsoever.

BACKGROUND OF THE INVENTION

The present invention relates to an improved panel. More specifically, without limitation, this invention relates to a panel made for use in portable flooring, folding tables, risers/platforms/event staging, and wall partitions.

There are numerous industries that use portable equipment and items in the preparation and production of events associated with those industries. The portable equipment used in and at these events are typically assembled and/or positioned prior to the event and removed after the event to allow alternate uses and/or different arrangements of the event venues. Examples of types of equipment that are assembled, moved and/or positioned during these events include portable flooring (such as dance floors, tent floors, stadium floors, etc.), folding tables, bench seating, event platforms/risers/staging, walls, and wall partitions.

For each of these various pieces of equipment, one of the general desirable characteristics is a generally planar shaped surface on which people and/or items will walk, stand, or are placed. Other desirable characteristics include high surface and structural durability, light weight, ease of assembly and disassembly, water resistant, various aesthetic patterns, images, and/or colors on the planar surfaces, and cost effective equipment pieces. To this end there have been numerous attempts in the art to construct various portable tables, portable floors, and the like. Examples of these attempts include U.S. Pat. Nos. 2,490,577, 2,849,758, 2,907,127, 2,911,274, 3,310,919, 3,323,797, 3,450,593, 3,512,324, 3,567,260, 3,582,447, 3,630,813, 3,676,279, 3,826,056, 3,868,297, 4,144,681, 4,353,947, 4,522,284, 4,645,171, 4,680,216, 4,879,152, 4,931,340, 4,973,508, 4,988,131 5,006,391, 5,070,662, 5,061,541, 5,154,963, 5,288,538, 5,348,778, 5,496,610, 5,569,508, 5,626,157, 5,634,309, 5,667,866, 5,776,582, 5,888,612, 5,947,037, 5,972,468, 5,992,112, 6,061,993, 6,117,518, 6,128,881 6,189,283 6,227,515, 6,235,367, 6,253,530, 6,446,413, 6,445,131, 6,505,452, 6,526,710, 6,743,497, 6,753,061, 6,761,953, 6,837,171 and 6,865,856. These patents are directed at various designs for tables, panels, locking mechanisms, portable flooring and the like. These patents use less than ideal methods to construct the substantially planar surfaces and connect these surfaces.

For example, in the portable flooring industry conventional flooring panels and the methods for making the same have several drawbacks. One type of typical conventional construction includes using oriented strand board or plywood cut to a preferred size from a large blank as the core structure. The perimeter of this core is machined to provide a contour to accept an edge and the core is coated on one side with a protective film for moisture protection. An edge structure is cut to a desired length and machined to facilitate assembly to the core. Then vinyl or wood parquet tiles are manually placed with adhesive glue onto one of the planar surfaces and then pressed and cured for somewhere between six to eight hours. The excess glue is cleaned off and the locking hardware is attached around the exterior.

An alternate conventional method of making the panels includes cutting a foam core to the preferred size and machining it to provide space for the locking hardware. Steel skins are cut and sized to fit over the foam and are glued to the foam core. A laminate skin is glued to the steel skin and then the panel is pressed and cured. Then the panel is placed into a mold wherein an elastomer edging is molded around the panel perimeter. The locking hardware is installed once the panel is removed from the mold.

Both of these conventional methods result in either very heavy panels that are difficult to transport or panels susceptible to water damage. Both of these methods are labor intensive, while the show surfaces, or show skins, of these panels are susceptible to glue failure rendering these panels disfigured and/or unusable.

The conventional panels and tables include other deficiencies. These include the susceptibility of these panels and tables to damage, especially along the edges, when the panels are in transit or even in use. The prior art panels and tables lack an edging that can both hold the surfaces together and provide significant shock-absorption capability. Additionally, one category of conventional tables lack sound absorption features. They are also heavy thus lacking portability and they do not stack well or compactly thus lacking storability.

Additionally, conventional portable tables have deficiencies in their storing and stacking capabilities. These conventional tables typically either have folding legs or a pedestal style support leg. The tables with folding legs have drawbacks in that the working parts of those legs can present a hazard when the legs are being retracted and extended, for example by potentially injuring the operators hands through pinching. These conventional foldable legs typically lack adequate support once they are in an extended position based upon the mechanics of their folding characteristics. Also, these conventional foldable legs are typically attached near the perimeter of the tabletop surface. This attachment reduces the effective seating capacity of these conventional tables by restricting access at the location near the perimeter where those folding legs are attached. Thus, conventional tables with foldable legs present hazards to the table operators, can lack adequate strength to support the table and its contents, and have a reduced effective seating capacity.

The conventional pedestal type tables have their own drawbacks. Typically these pedestal type tables have a connection piece that extends outwardly from the bottom surface of the tabletop to hold the table leg. This extension, which is typically as thick if not thicker than the actual tabletop itself, severely restricts the stacking and storage capabilities of the conventional pedestal type tables. For example, the typical conventional tabletops range from 0.750 to 2.0 inches thick while the typical convention connection for the leg is approximately 2.375 inches thick. This thickness discrepancy greatly increases the amount of storage spaced need for the convention tables when not in use and increase the size of equipment need to transport and store those conventional tables.

Additionally, these traditional pedestal style tables do not typically have quick release connections between the support and the tabletop. Most stackable and portable traditional pedestal style tables require the release of multiple fasteners between the tabletop and leg or the leg and base. This substantially increases set up and disassembly times resulting in increased labor costs and the reduction of the effective use of the table.

What is needed then is a new portable table that combines a light weight and durable construction for easy and convenient transport, storage, and prolonged product life in use. The preferable table is manufactured with more cost effective, less labor intensive methods to make the panel affordable to a broad cross-section of the market. This needed table is lacking in the art.

BRIEF SUMMARY OF THE INVENTION

Disclosed herein is a portable panel having numerous favorable characteristics. The panel comprises a core having a length, a width, a first side and a second side. A first fiber layer is attached to the first side while a second fiber layer is attached to the second side. A first polyurethane layer is impregnated in the first fiber layer while a second polyurethane layer is impregnated into the second fiber layer. A first outer skin is attached to the first polyurethane layer while a second outer skin is attached to the second polyurethane layer. Each of these steps can take place individually and then the composite is placed into a press for a cure cycle.

Also disclosed is a portable table comprising support legs and a planar surface attached to the support legs. The planar surface includes a core having first and second fiber layers attached on first and second sides of a core. First and second polyurethane layers impregnate the first and second fiber layers, respectively, while first and second outer skins are attached to the first and second polyurethane layers, respectively. Each of these steps can take place individually then the composite is placed into a press for a cure cycle.

Also included is a portable table wherein legs connect to a panel through a structure that is mounted within the core of the panel.

Also included is a portable floor comprising a plurality of panels. Each panel includes a core having first and second sides. The first side has an attached first fibered layer impregnated by a first polyurethane layer and a first skin attached to the first polyurethane layer. Attached to the second side of the core is a second fiber layer impregnated with a second polyurethane layer having a second skin attached to the second polyurethane layer. A frame surrounds the core wherein the frame includes two male sides and two female sides. The female sides include an engaging location and a channel having a channel length substantially equal to the core length. The male sides include a protrusion shaped to engage the channel and a locking mechanism. The protrusion has a protrusion length substantially equal to the channel length.

Also included is a method of constructing a panel. The method comprises providing a core, attaching a first fiber layer to the first side of the core, and attaching a second fiber layer to the second side of the core. The method further includes impregnating first and second polyurethane layers into the first and second fiber layers, respectively, and preferably immediately attaching a first skin to the first polyurethane layer and a second skin to the second polyurethane layer. The entire composite is then placed in a press where it cures for a period.

Also included is a method of preventing lateral panel movement when a floor is assembled. The panels are secured together by the cam locks which are located in the male extrusion lengths. The method used to prevent the panels from sliding laterally is accomplished with apertures located on the male side in the section cutout for the lock to receive two protruding pieces, such as cap head screws, located on the female side.

Also included is a portable table comprising a planar surface, a column connection, and a column. The planar surface includes a core having a length, a width, a thickness, a perimeter section, and a bottom surface. The column connection is positioned within the thickness of the core and includes a flange and a cylindrical sleeve having a first fastener. The exposed side of the flange can be recessed into the bottom side of the panel, can be co-planar with the bottom side of the panel, or can be flush with the bottom side of the panel. The column includes an insertion end having a second fastener shaped to removably engage the first fastener and secure the column to the column connection. The insertion end is shaped to removably fit through the flange and into the cylindrical sleeve of the column connection.

The table could further include a frame bonded to the perimeter section of the core, as well as a collar attached to the column and spaced from the insertion end with the collar shaped to match the flange. The table can further include a base having a column opening wherein a base end on the column is shaped to removably engage the column opening on the base.

The integration of light weight panel technology into a series of products with specific advantages in production and use is taught with this disclosure. The inventive panels relate generally to a process of polyurethane construction using combinations of fiber layers arrayed on both sides of a light weight core material with external skins bonded integrally to the polyurethane layers. The various layers can be bonded to both sides of the panel through the polyurethane polymerization process.

Advantages of the panels of the current invention, as compared to those of the prior art, include a lighter weight panel that facilitates transportation and assembly and storage. The current invention can have a reversibility option with multiple patterns, designs and/or color options on the opposing sides. The various layers and skin have superior adhesion due to the impregnation and attachment of the skins during the curing process and the superior adhesive characteristics of polyurethane. The inventive panels have a substantial labor saving cost and specifically do not require a mold for their construction. This is an advantage since the use of a mold can severely restrict the economics of producing large panels and requires significant capital investment for the molds and presses. A mold also requires cleaning and maintenance both of which add to cost and time for the production of the panels. As such, the elimination of the use of a mold in panel construction can greatly reduce the production time and increase cost savings during the production of the inventive panels.

For example, the molds discussed in some of the prior art, namely U.S. Pat. No. 6,761,953 use an open mold containing the outer layer and optionally the decorative layer. The prior art fails to place the layers on to the composite materials outside of a press and without a mold. The production of the current inventive panels is facilitated by the flat geometry of the parts and the use of a pre formed perimeter enclosure, such as aluminum or elastomer edging. The elastomer edge can provide part shape opportunities that are not possible with extrusion.

Additionally, the inventive panels can be approximately 30% thinner than the existing panels which can enhance the safe use and operation of the panel. For example a thinner panel reduces the likelihood of trips and falls caused by the thickness of the panels when laid flat and used in a portable flooring embodiment. Additionally, the exterior surfaces on the inventive panels are superior in terms of wear, durability, and maintenance thereof. Additionally the panel lateral movement suppression system is a unique, cost effective, and practical method to prevent the panels from sliding when engaged.

Other advantages include the portable, stackable, storable nature of the lightweight table. As compared to other tables currently in use, the currently disclosed inventive table can withstand edge abuse, facilitate stacking more inventive tables in a smaller space and allow inventive tables to be stacked flat against each other. For example, conventional cocktail tabletops have a connection plate that mounts beneath the tabletop. This connection plate substantially prevents the conventional tabletops from being securely stacked. The current inventive table having a connection plate mounted within the core as an integral part of the core and positioned at least co-planar within the bottom planar surface of the tabletop results in a flat panel that can be stacked in a very efficient manner.

The inventive panels can have various applications in numerous industries. These industries include hospitality and entertainment industries such as: hotel, recreation centers, banquet halls, conference centers, stadiums, schools, outdoor activities with and without tents, and other similar facilities/locations. For example, portable flooring made in accordance with the current inventive panels can be set up and used indoors or outdoors with minimal assembly and disassembly time. These inventive panels facilitate these applications due to their strength, durability, water resistant nature, light weight, and positive interconnection between adjacent panels. For example, dance floors, tent floors, stage floors or other portable flooring applications can be ideally made using the inventive panels. Flooring so made can include a perimeter composed of an elastomer or extruded metal framework using tongue and groove profiles for panel interconnection. Alternately at least one of the sides can be shaped to interact with supporting feet and/or legs used to facilitate the upright placement of the panels, such as in a wall configuration.

It is therefore a general object of the present disclosure to provide an improved panel.

Another object of the present disclosure is to provide a method for making an improved panel.

Still another object of the present disclosure is to provide an improved panel that can be used in the making of a portable floor, folding tables, risers, event staging, and wall partitions.

Another object of the present disclosure is to provide portable flooring system having a lateral movement suppression mechanism positioned to restrict movement of panels relative to adjacent panels in the portable flooring system.

Still another object of the present disclosure is to provide a panel having multiple show surfaces that can vary in appearance, design, texture, color, and the like.

Yet another object of the present disclosure is to provide a panel as the tabletop of a portable table, facilitating mobility of the portable table while maintaining a satisfactory level of stability when in use.

Another object of the present disclosure is to provide a panel as the tabletop of a table having an edging that can both hold the surfaces together and provide significant shock-absorption capability.

Still another object of the present disclosure is to provide a panel as the tabletop of a table that includes sound absorption features.

Yet another object of the present disclosure is to provide a panel as the tabletop of a portable table that has the ability to be stacked flat so as to take up less space when not in use and still maintain a desired level of stability when in use.

Another object of the disclosure is to provide a lightweight panel wherein legs connect to a panel through a structure that is mounted within in a core of the panel.

Other and further objects, features and advantages of the present disclosure will be readily apparent to those skilled in the art upon reading of the following disclosure when taken in conjunction with the accompanying drawings.

BRIEF DESCRIPTION OF THE SEVERAL VIEWS OF THE DRAWINGS

FIG. 8A is a top perspective view showing a female side of the frame.

FIG. 8B is bottom perspective view showing a female side of the frame.

FIG. 10A is a bottom perspective view showing a male side of the frame.

FIG. 10B is a top perspective view showing a male side of the frame

FIG. 18A is a side view of a tabletop made in accordance with the current disclosure.

FIG. 18B is a bottom view of the tabletop show in 18A.

FIG. 18C is a partial cross-section of the tabletop show in 18A.

FIG. 18D is a detailed partial cross-section view of the circled area shown in 18C.

FIG. 19A is a side view of a tabletop made in accordance with the current disclosure.

FIG. 19B is a bottom view of the tabletop show in 19A.

FIG. 19C is a cross-sectional view of the tabletop show in 19B taken along line A-A.

FIG. 19D is a cross-sectional view of the tabletop show in 19B taken along line B-B FIG. 19E is an end view of the tabletop shown in 19A.

FIG. 19F is a detailed cross-section view of an example of a frame around the table shown in 19A-E.

DETAILED DESCRIPTION OF THE INVENTION

Referring generally to FIGS. 1-34, a panel is shown and generally designated by the numeral 10. The panel 10 has many uses and can be used in conjunction with a portable floor, as seen in FIGS. 1-12, a portable table, as shown in FIGS. 13, 14 and 18-34, risers, bleachers event staging, walls, and the like.

Figure 1:
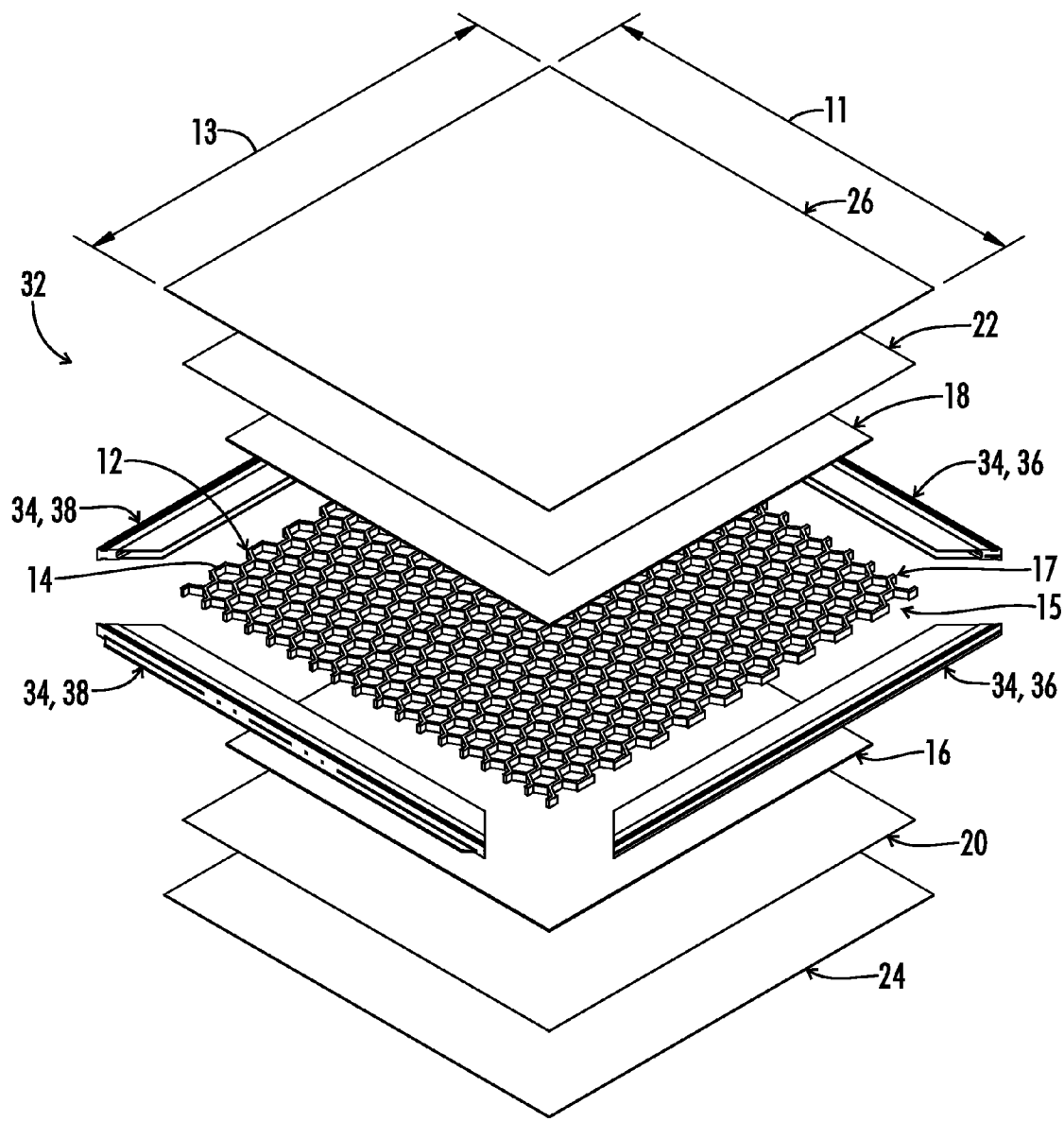
FIG. 1 is an expanded perspective view of a panel made in accordance with the current disclosure and used in connection with portable flooring.
Figure 13:
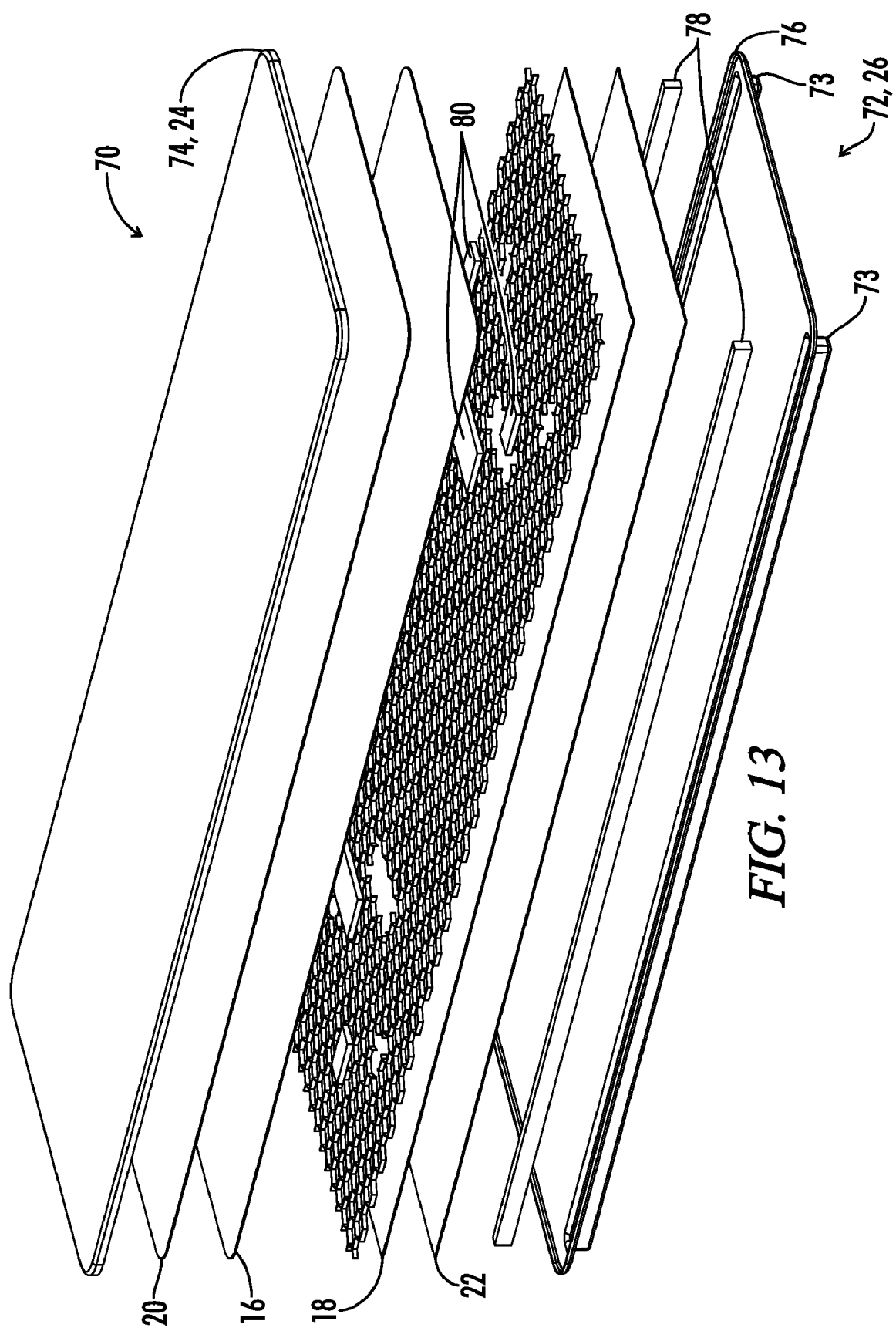
FIG. 13 is an expanded perspective view of a tabletop made in accordance with the current disclosure.
Figure 14:
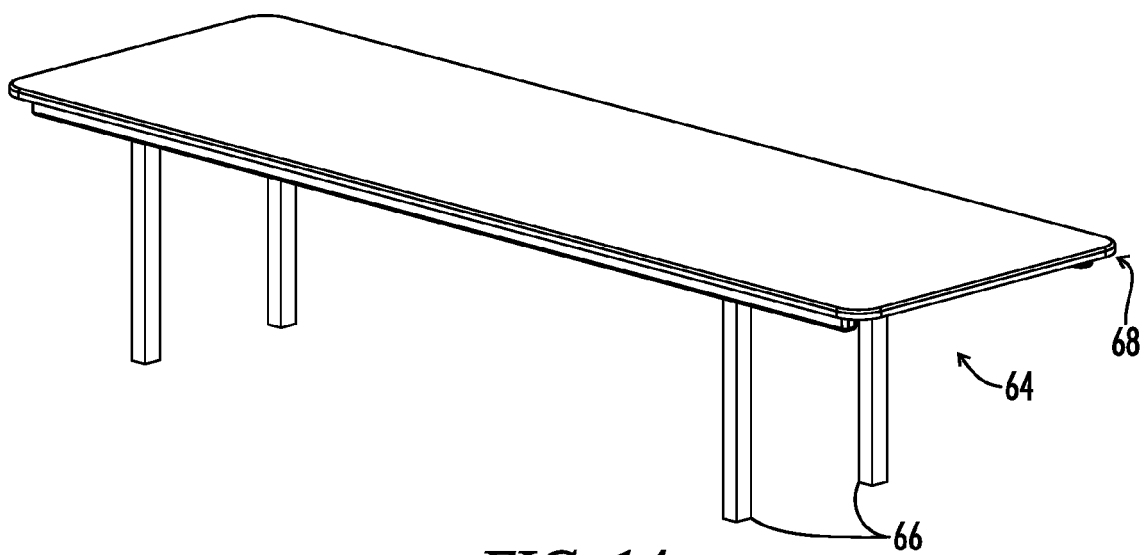
FIG. 14 is a perspective view of a portable table made in accordance with the current disclosure.

The panel 10 will have a core 12. The core can be made from many materials including paper honeycomb, plastic honeycomb, polyurethane, EPS, wood, metal, and the like. The core can preferably include a plurality of openings 14 wherein the openings are substantially uniformly spaced along the width 11 and length 13 of the core. The openings 14 can be honeycomb in shape as best seen in FIGS. 1 and 13.

First and second fiber layers 16 and 18 are attached to the first and second sides 15 and 17 of the core 12. First and second polyurethane layers 20 and 22 impregnate first and second fiber layers 16 and 18 respectively. First and second skins 24 and 26 are attached to the first and second polyurethane layers 20 and 22, respectively.

The first and second skins 24 and 26, which can also be first and second laminate skins, are attached to the polyurethane layers before the polyurethane layers dry. This creates a strong bond between the skins and the polyurethane layers to increase the durability and attachment thereto. Additionally the impregnation of the polyurethane layers through the fiber layers increases the strength and bonding of the polyurethane layers and skin to the fiber layers and a core upon which they are attached. Prior to application of the polyurethane the fiber layers 16 and 18 are attached to the core 12. For example, staples, glue or other fastening systems known in the art to attach fiber layers to a core layer can be used.

Panels constructed in accordance with this disclosure have many benefits including exhibiting a light weight and a high strength for a given cross section, especially in view of prior art panels. The current inventive panels also include an option for the addition of strengthening ribs and/or edges to the design. Additionally an integral column mount or leg support structure can be mounted within the lightweight core. Many surface finishes are possible including, but not limited to leather, laminate, vinyl, spray polyurethane, wood grain, texture and color variances, such as the use of various paints. Additionally various patterns and/or designs can be incorporated into the skins 24 and 26. These variances can be realized through the type of skin 24 and 26 that is bonded in with the polyurethane layers 20 and 22 around the fiber layers 16 and 18 and a core 12. Additionally an ultraviolet protective coating can be added if desired. Panels so constructed are also water resistant and have an increased durability for a wide range of uses.

The first and second skins 24 and 26 can comprise sound attenuating or sound absorbing material. For example one or both of the skins 24 and 26 could include sound attenuating material. In a preferred embodiment, the second skin 26 covers the bottom portion of a table and comprises fabric, such as cloth. This type of second skin can deaden sound and is less likely to abrasively engage something sliding under the table, such as the clothing or body parts of a person sitting, or seated, at the table. This selection of the sound attenuating material can provide a noticeable sound difference in a room filled with such tables.

The first and second skins 24 and 26 can comprise a metal portion that extends substantially the width 11 and length 13. This laminate/metal skin composite can be placed over the wet polyurethane and fiberglass as described above. This laminate/metal skin composite helps to prevent warping caused by expansion and retraction of the laminate that is associated with changing environmental conditions. For example, the inward forces on a 48 inch by 48 inch panel were calculated to be 10,000 lbs when the laminate dries out. The metal skin can prevent the laminate from moving and prevent warping of the panel 10.

One example of an item in which an inventive panel can be used is in the production of a portable floor. The portable floor 30 includes a plurality of floor panels 32 that include the core 12, fiber layers 16 and 18, polyurethane layers 20 and 22, and skins 24 and 26 as previously discussed. Additionally, each panel includes a frame 34 surrounding the core 12. The frame 34 preferably includes two (2) female sides 36 and two (2) male sides 38. The female side 36 includes a lock engaging section 41, and a channel 42 having a channel length 44 substantially equal to the core length 13. The female side 36 is extruded such that it can directly engage the protrusion 46. The male side 38 includes the protrusion 46 shaped to engage the channel 42 and a locking element 48. The protrusion 46 has a protrusion length 50 substantially equal to the channel length 44.

Figure 2:
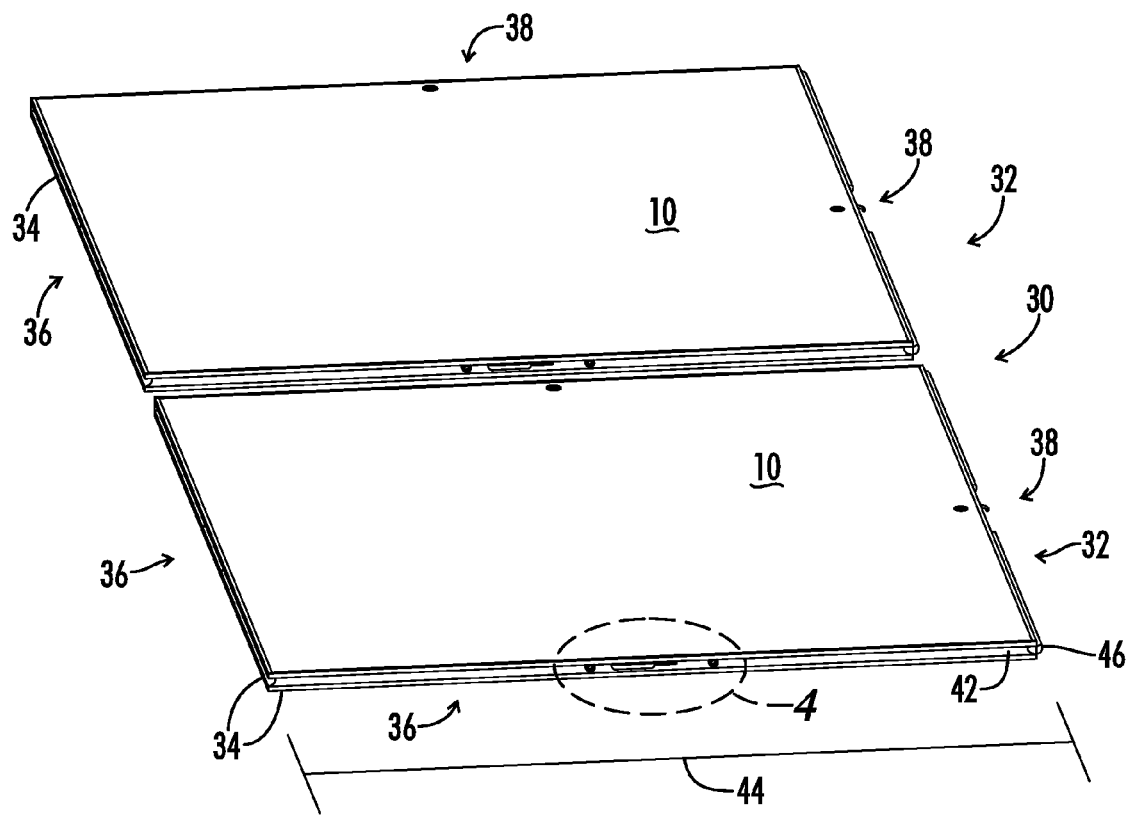
FIG. 2 is a top perspective view of portable flooring made in accordance with the current disclosure.
Figure 3:
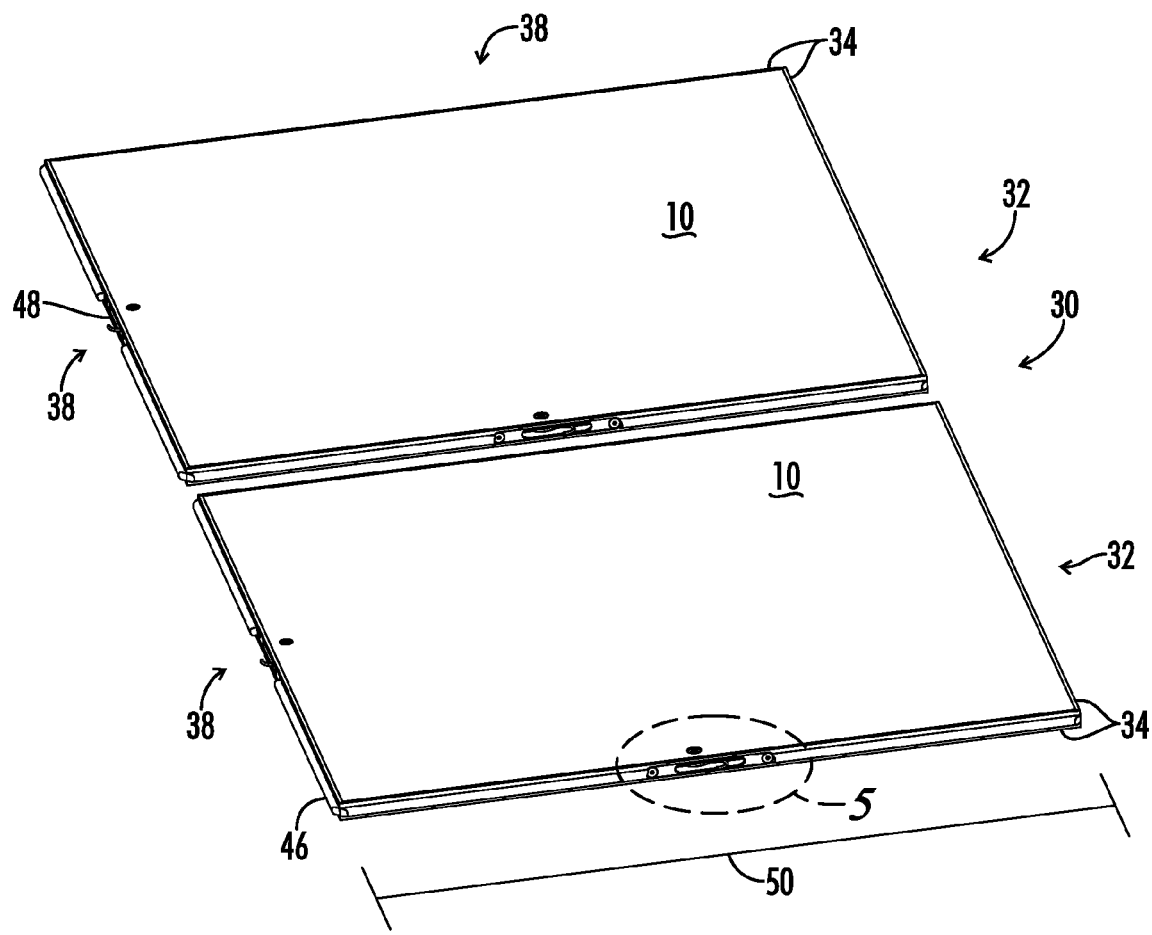
FIG. 3 is a bottom perspective view of FIG. 2.
Figure 4:
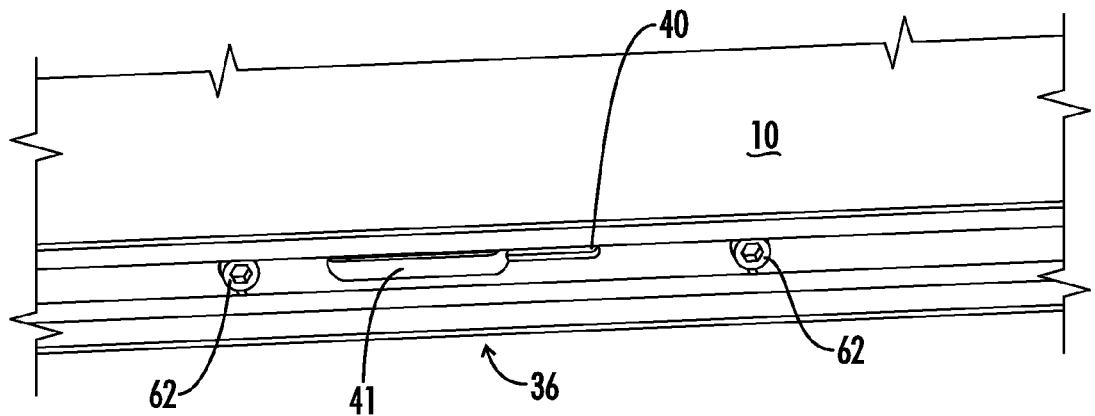
FIG. 4 is a detail view of the area circled and labeled as 4 in FIG. 2.
Figure 5:
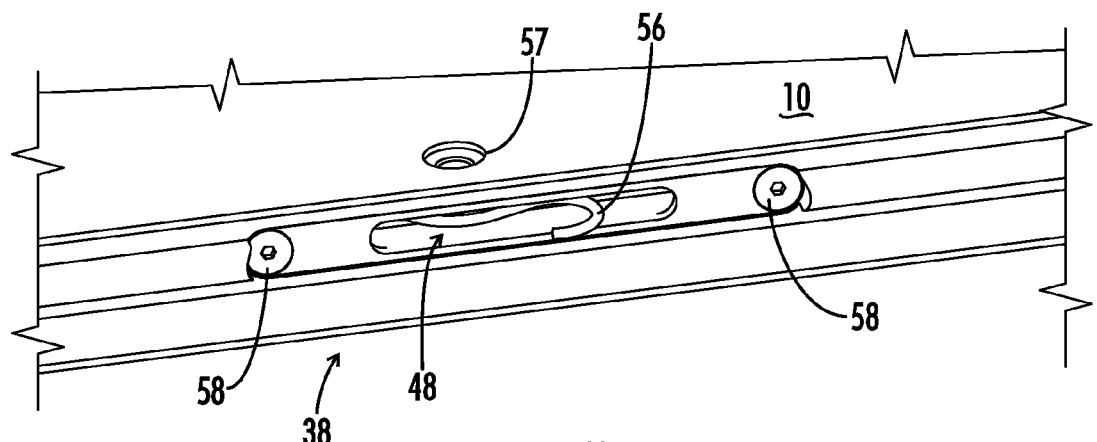
FIG. 5 is a detail view of the area circled and labeled as 5 in FIG. 3.
Figure 6:
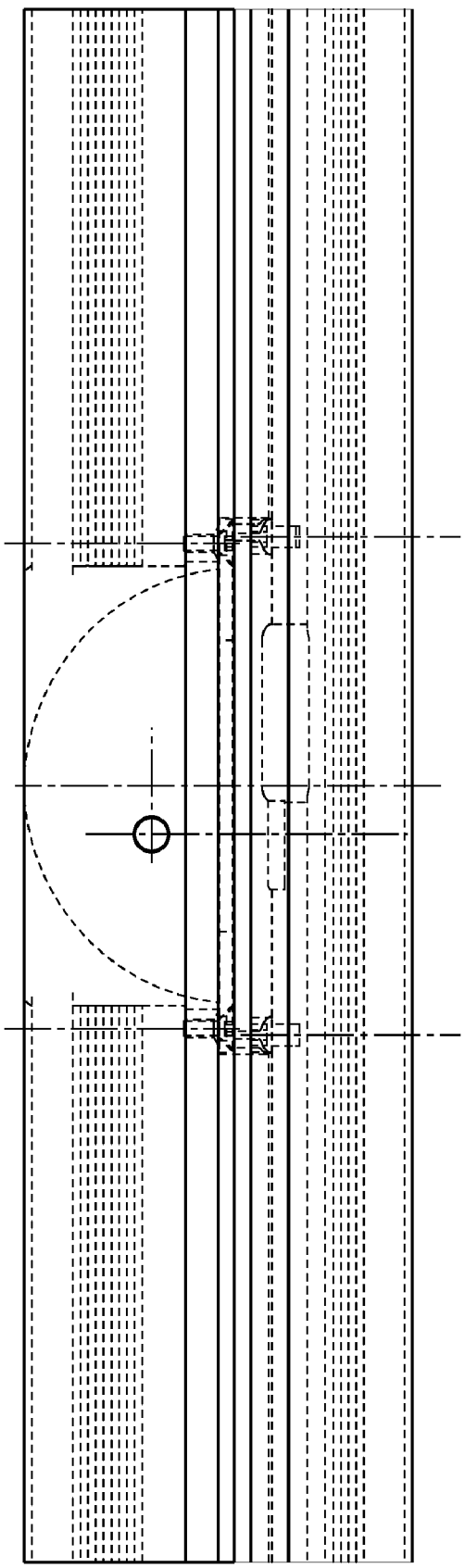
FIG. 6 is a top view of a portion of the frame for a portable floor made in accordance with the current disclosure.
Figure 7:
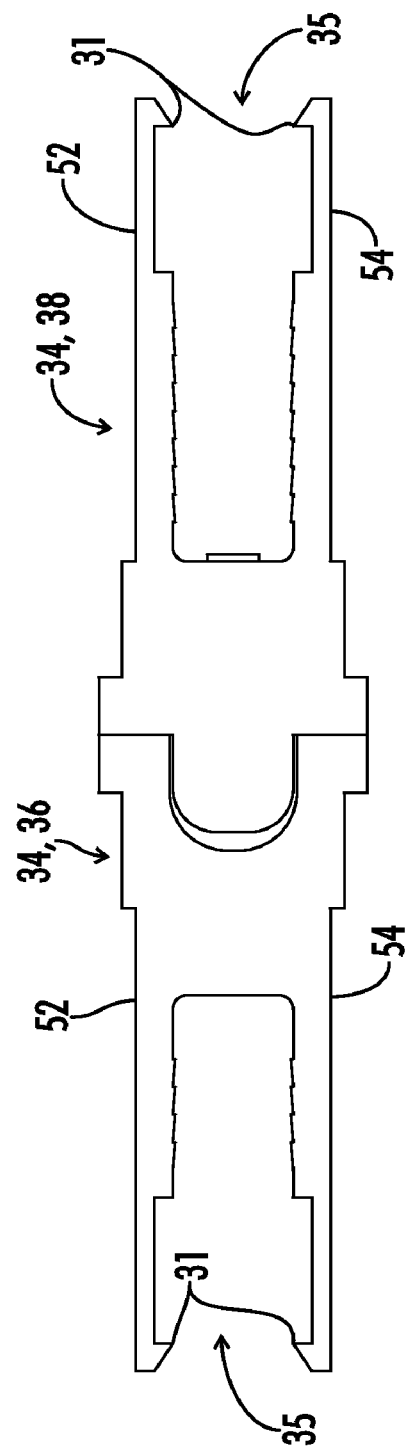
FIG. 7 is a side end view of FIG. 6 view showing the male and female sides of the frame engaged.
Figure 9:
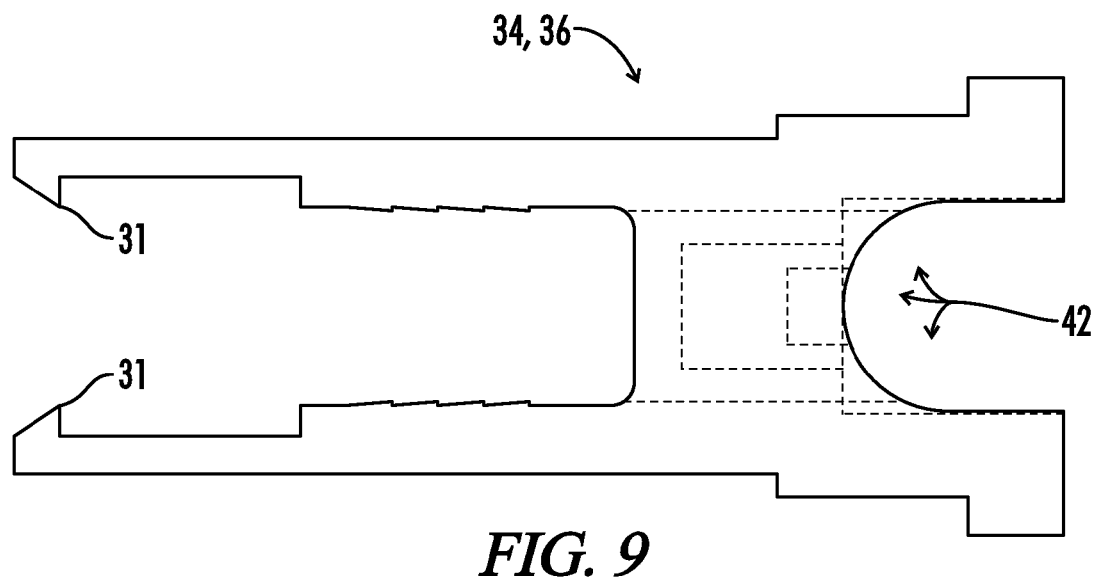
FIG. 9 is a side end view of the female side of the frame.
Figure 11:
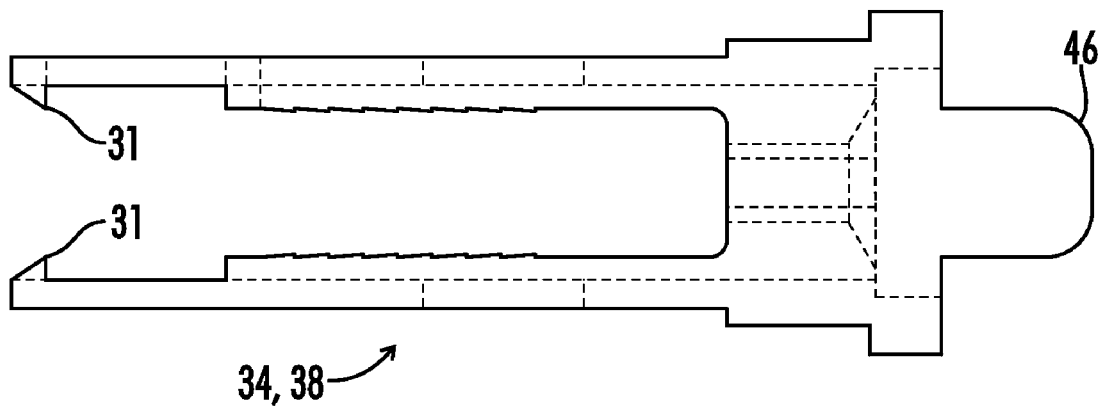
FIG. 11 is a side end view of the male side of the frame.
Figure 12A:
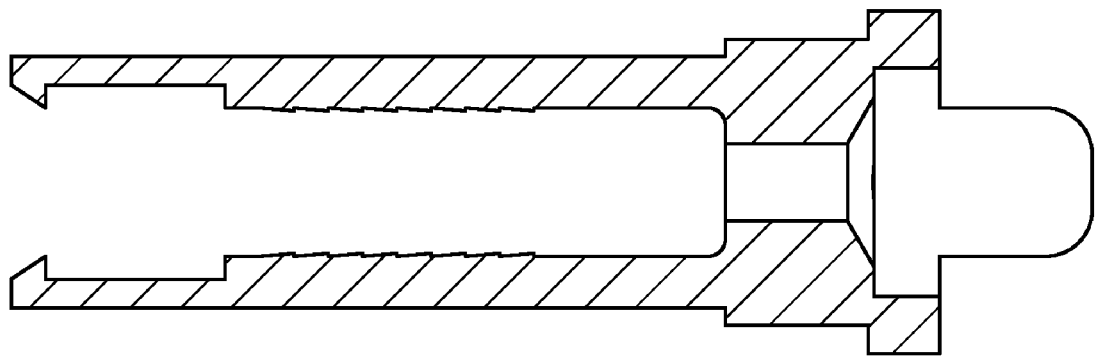
FIG. 12A is a cross-sectional view of the male portion shown in FIG. 11.
Figure 12B:
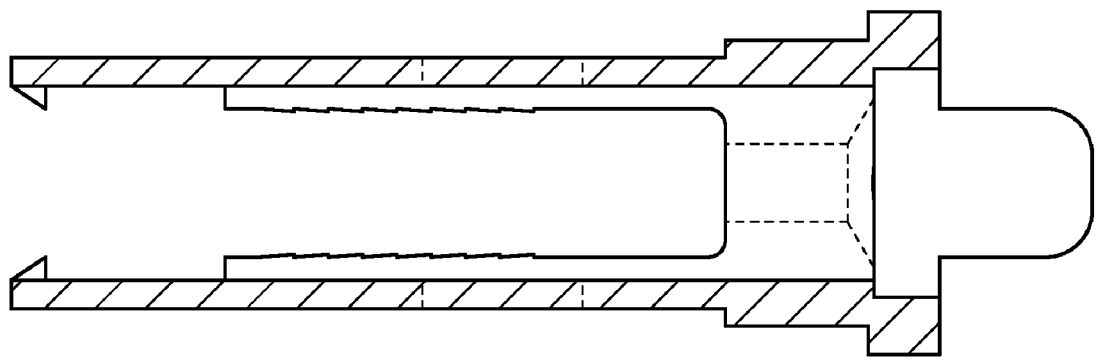
FIG. 12B is an alternate cross-sectional view of the male portion shown in FIG. 11.

In a preferred embodiment the frame is composed of metal, such as aluminum, but can also be constructed of polymers. The protrusion 46 of one of the panels 32 is positioned to engage the channel 42 of an adjacent panel 32 to restrict movement of the panels in relation to one another. The engagement between the protrusion 46 and channel 42 preferably restricts both rotational and vertical movement of the panels in relation to one another. This can best be illustrated by FIG. 7 and FIGS. 2-3 showing engaged and disengaged embodiments of the male and female sides 36 and 38 of the frame 34.

The frame 34 is designed with panel gaps 35 spaced to accept the core. The fiber layers, polyurethane layers and skins are all placed over the frame on the external surfaces 52 and 54 to increase the bonding and engagement between the frame pieces 34. The external surfaces opposite 52 and 54 also receive a fiber layer, polyurethane, and a skin.

The locking element 48 preferably includes a rotatable hook 56 that engages the extrusion of the female side or part 36. Fasteners such as screws 58 can hold in the hook or lock 56. This hook further facilitates the engagement between adjacent panels 32 during on-site assembly of the portable floor 30 and their disengagement upon disassembly of the floor after use. To engage the extrusion the hook 56 is rotated, for example using a known device such as an Allen wrench, inserted into hole 57. Correspondingly, the female side 36 includes engaging aperture 41 into which the locking element 48 engages to secure adjacent panels 32.

The floor panels 32 can also be constructed to include an alignment/lateral movement suppression system. The system comprises a gap in the protrusion 46 where the locking element 56 is located. This gap is used as a guide to mate to two pegs 62, which can be cap head screws, located in the female side 36. As such, corresponding floor panels 32 are aligned to establish a portable floor 30 that will be secure.

The extrusion incorporates at least one tooth 31 running the length of the extrusion on both sides of the channel 35. This tooth 31 is compressed so as to bite into the core to secure the frame to the core.

Figure 15:
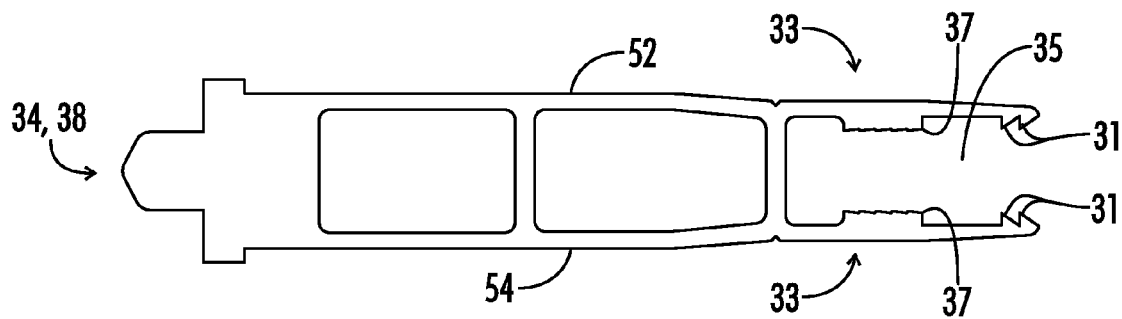
FIG. 15 is a side end view of a male side of the frame.
Figure 16:
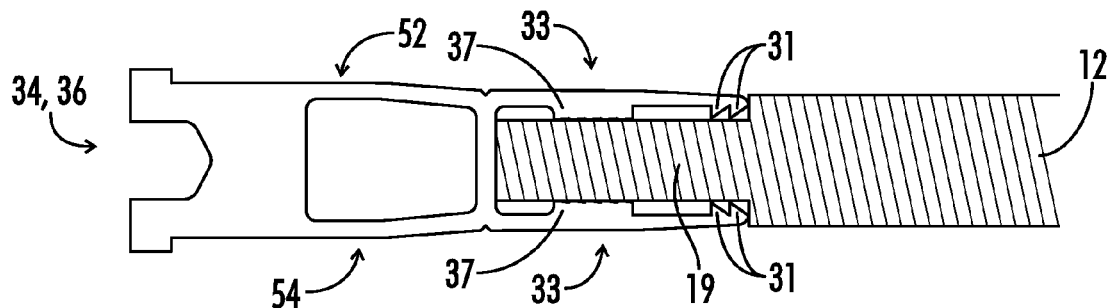
FIG. 16 is a side partial cross-section view showing a female side of the frame with a portion of the core positioned in the channel.
Figure 17:
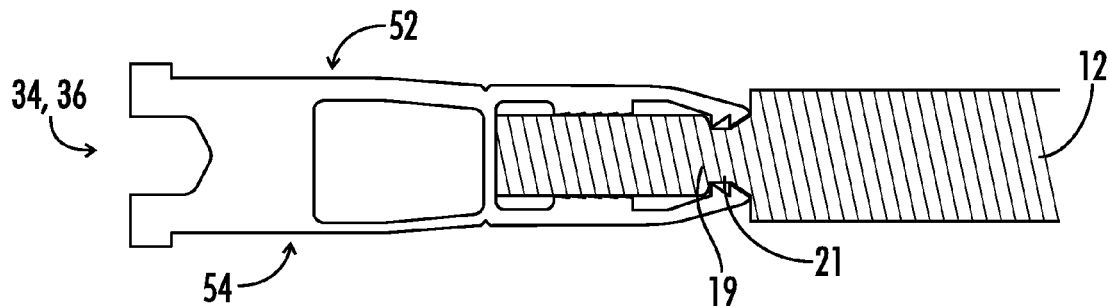
FIG. 17 is a side partial cross-section showing a female side of the frame with a portion of the frame compressed around the perimeter section of the core.
Figure 20A:
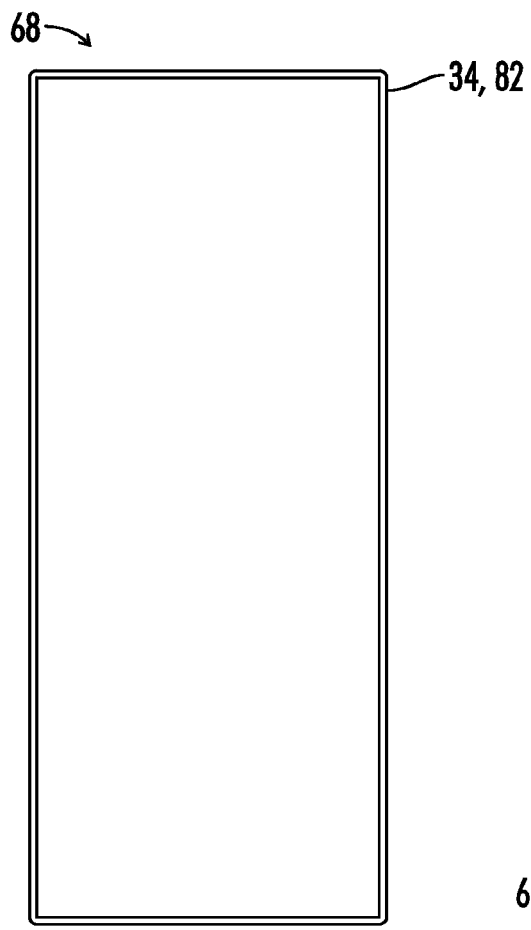
FIG. 20A is a top view of a tabletop made in accordance with the current disclosure.
Figure 20B:
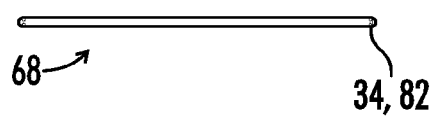
FIG. 20B is an end view of the tabletop show in 20A.
Figure 20C:
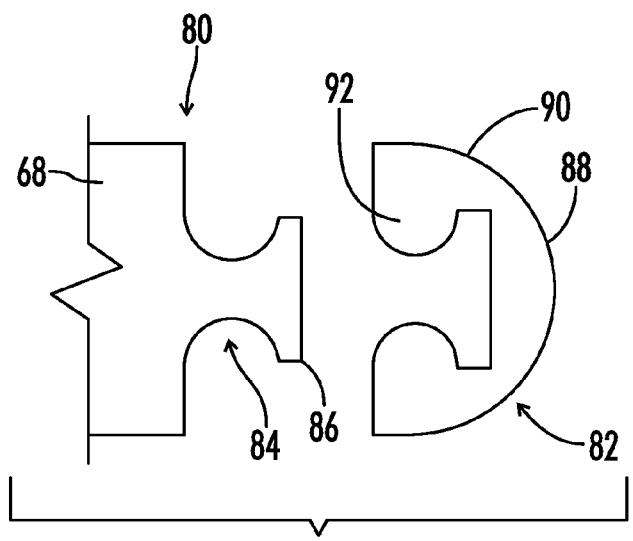
FIG. 20C is a detailed exploded end view of a frame and pinched edge on the table shown in 20A-B.
Figure 21A:
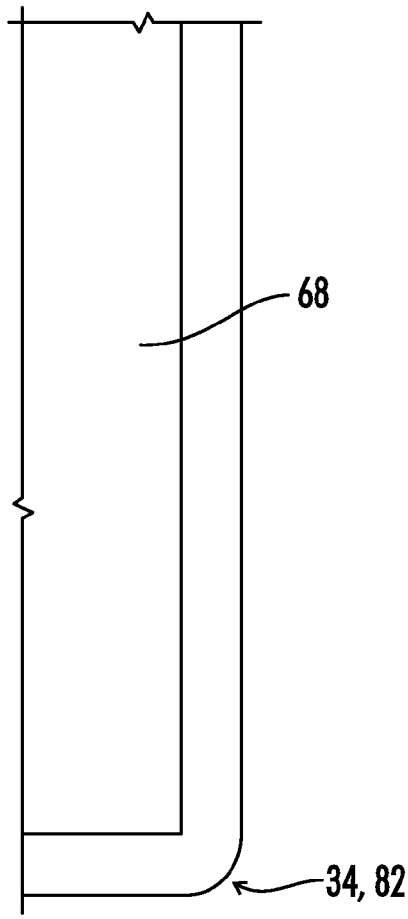
FIG. 21A is a partial top view of a tabletop made in accordance with the current disclosure.
Figure 21B:
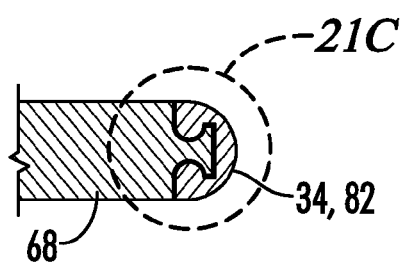
FIG. 21B is a cross-sectional view of the tabletop show in 21A.
Figure 21C:
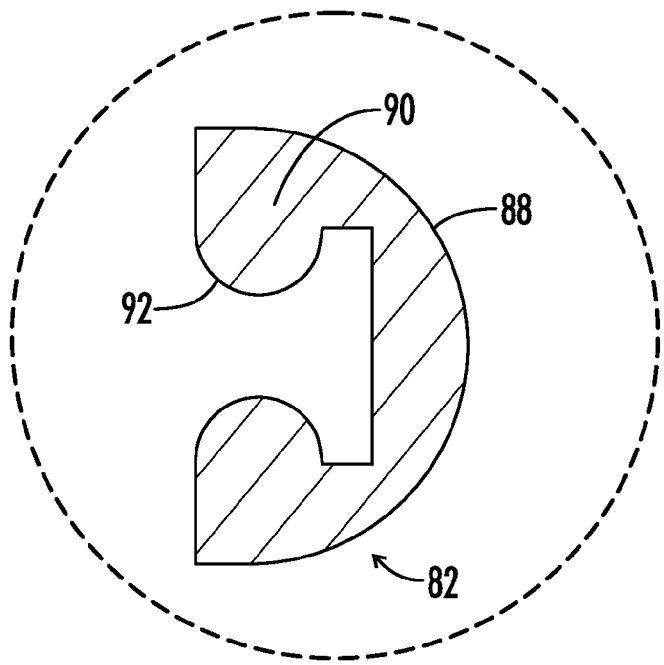
FIG. 21C is a detailed exploded end view of a pinched edge on the table shown in 21A-B.

As illustrated in FIGS. 15-17, multiple teeth 31 can extend inwardly from the sides, or projections 33, of the channel 35 to engage the core 12. The projections can include stabilizers 37, also extending inwardly, to engage the core 12. The core can include a perimeter section 19 that includes a reduced thickness. The reduced thickness can be positioned in the channel 35 and the projections 33 can be forced, or compressed, inwardly. The compression of the projections 33 inward can further reduce a neck portion 21 of the perimeter section 19. The teeth 31 can extend into the neck portion 21 and engage the perimeter section 19 at the neck portion 21. This can result in a reduced thickness of the channel 35, corresponding generally to the location of the teeth 31, as compared to the rest of the channel 35. This facilitates the hold between the frame 34 and the core 12.

The engagement of the frame 34 to the core 12, through both the teeth 31 and the various layers and skins, and the engagement of the portions of the frame to each other for a given panel 10 provides an excellent resistance to deformation, including deformation by warping. This encapsulated frame, or extrusion, is designed strongly enough to overcome the bowing forces caused by expansion and retraction of the laminate and the adhesion is strong enough to maintain the integrity of the various layers.

Another example of a device incorporating one of the current inventive panels is a portable table 64. The portable table 64 includes support legs 66 and a planar surface 68 attached to the support legs 66. The planar surface 68 includes one of the panels 10 and a top exterior skin 70 and bottom exterior skin 72. The top skin 70 and bottom skin 72 can be specifically designed for use as a table and can include corresponding edges 74 and 76 that engage and can be sealed together.

The table 64 can also include support structures 78 that are substantially equal to the core length 13. The support structures 78 can provide additional rigidity to the table 64. Additional support structures, such as flat steel stock, 81 can be positioned in the core 12 between the polyurethane layers 20 and 22. These supports can be used to attach the hardware from the legs 66 to the planar surface 68.

The bottom skin 72 can have recessed areas 73 positioned to accept the support structure 78. This can also provide a handle area by which to carry the tables 64. The table 64 can be made in both circular and polygonal shapes, such as rectangular, square and the like. Alternately, the legs 66 can be attached to the planar surface 68 or tabletop 68 by wood or metal inserts that are integral to the bottom skin 72.

As seen in FIGS. 19B-E, the table 64 can include recessions 75 that facilitate storage of the support legs 66 when the table 64 is not in use. The recession can "hide" the legs 66 to facilitate stacking of the tables. The legs 66 can still be visible, but the legs 66 can be positioned in a manner that allows the tables 64 to be stacked, for example 10-20 high. For example, the bottom side of the table 64 can be indented or crushed to accept the legs 66. More specifically, the bottom side of the core 12 can be indented making an impression where the legs 66 will fit when the table 64 is stacked and maintain the bottom of the table 64 substantially flat. The legs 66 can fit into the bottom of the table to result in a substantially coplanar arrangement with the planar surface of the table when folded. Alternately described, the legs and table can be substantially flush when the legs are folded into the table.

Figure 22A:
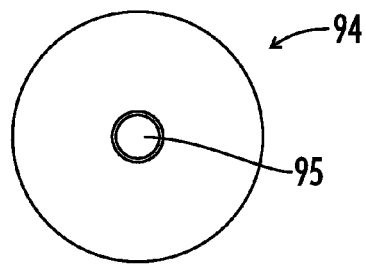
FIG. 22A is bottom view of an integral column connection in accordance with the current disclosure
Figure 22B:
FIG. 22B is a cross-sectional view of the column connection of FIG. 22A.
Figure 22C:
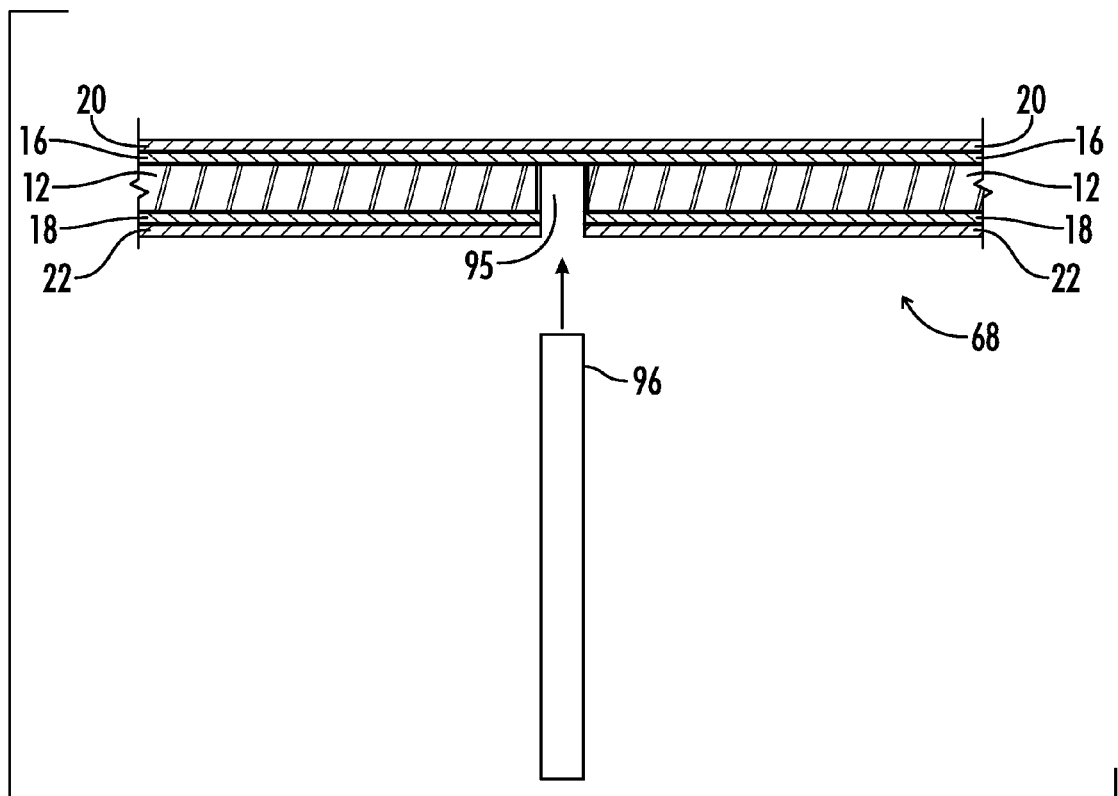
FIG. 22C is a cross-sectional view of a portion of core of a panel having an integral column connection mounted therein.
Figure 23A:
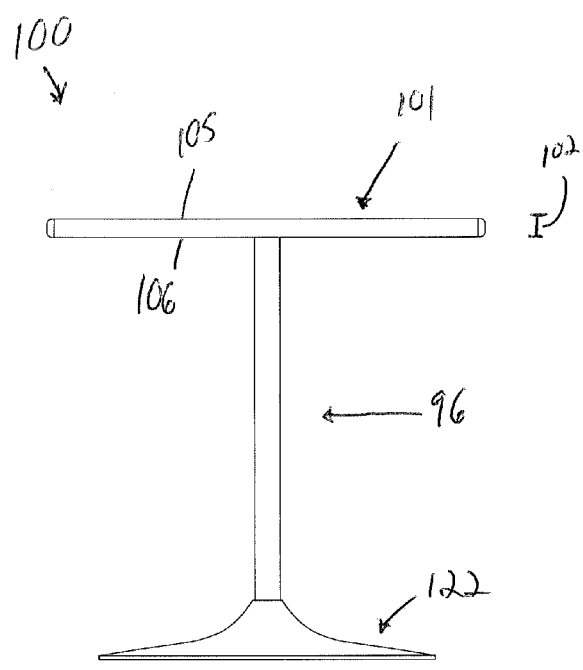
FIG. 23A is a front view of an assembled table made in accordance with the current disclosure
Figure 23B:
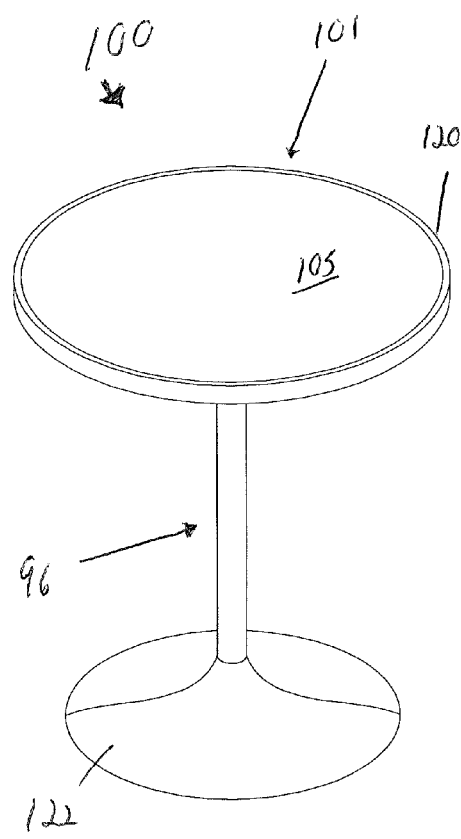
FIG. 23B is a perspective view of the table shown in FIG. 23A.
Figure 24:
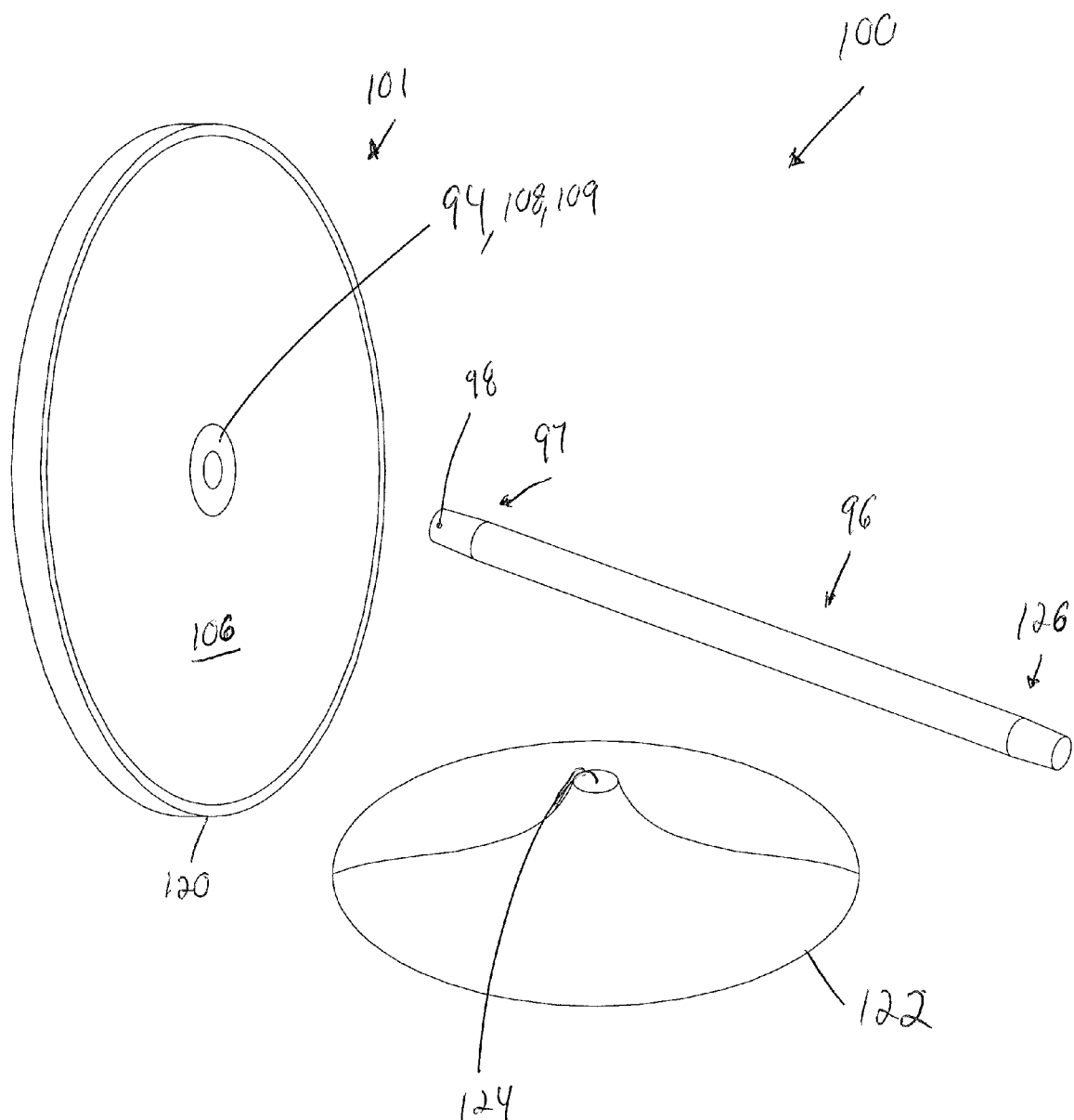
FIG. 24 is an expanded view of the table shown in FIG. 23A.
Figure 25:
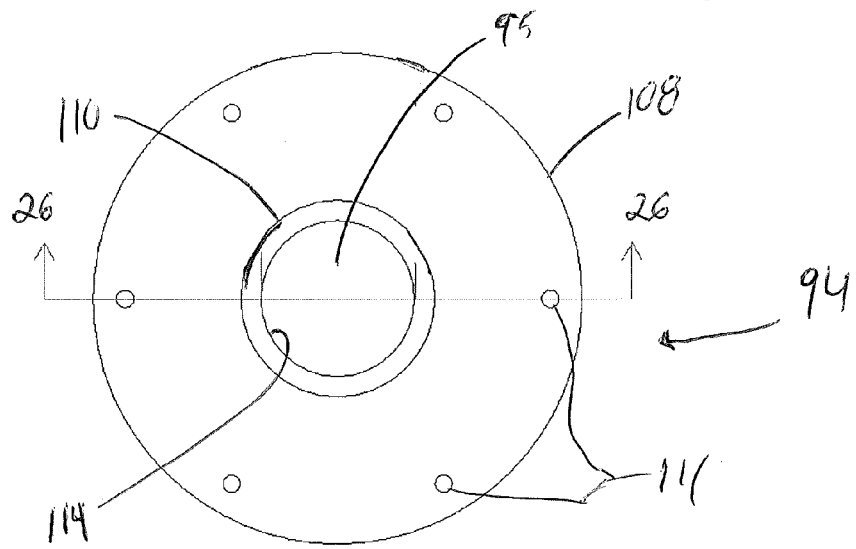
FIG. 25 is a top view of a column connection made in accordance with the current disclosure.
Figure 26:
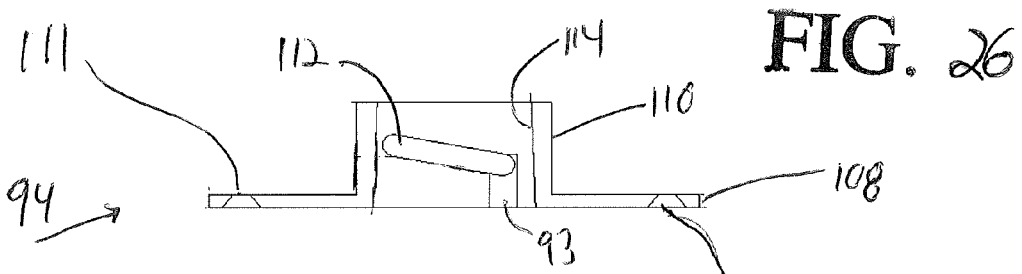
FIG. 26 is a cross sectional view taken along line 26-26 of FIG. 25.
Figure 27:
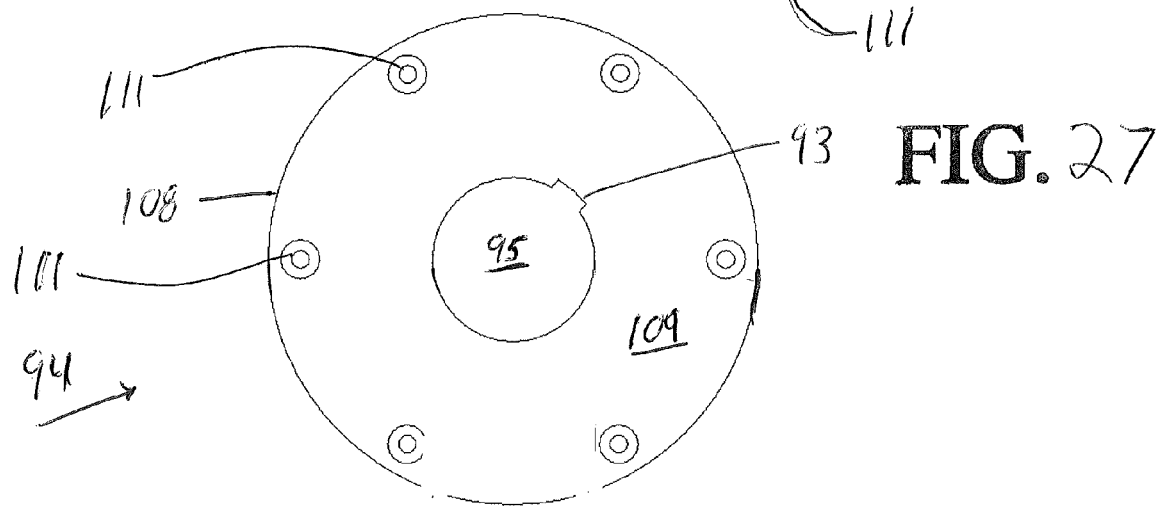
FIG. 27 is a bottom view of the column connection shown in FIG. 25.
Figure 28:
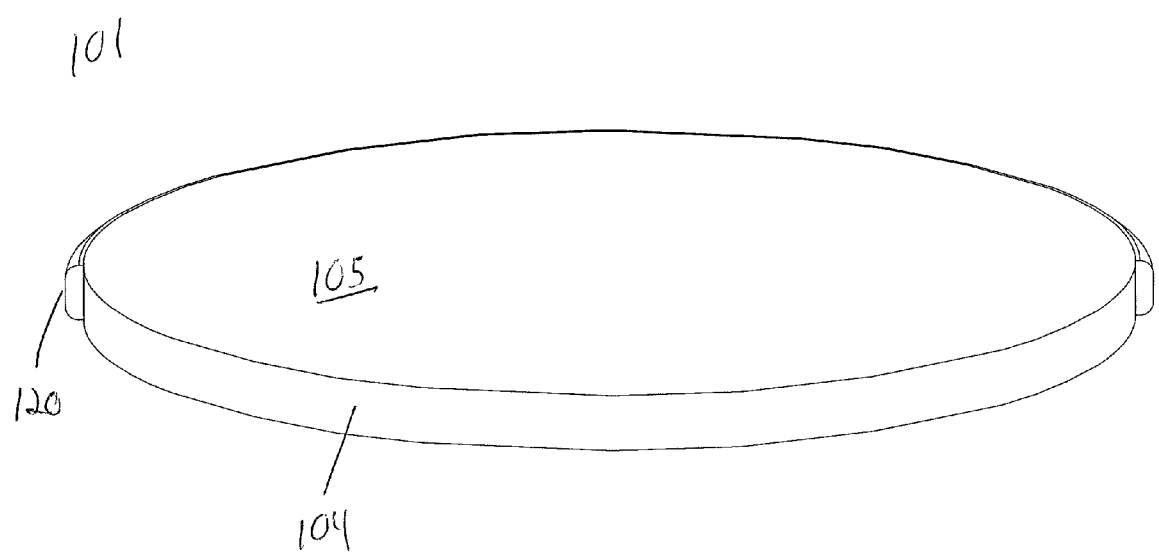
FIG. 28 is a partial detailed view showing an example of a tabletop made in accordance with the current disclosure.
Figure 29:
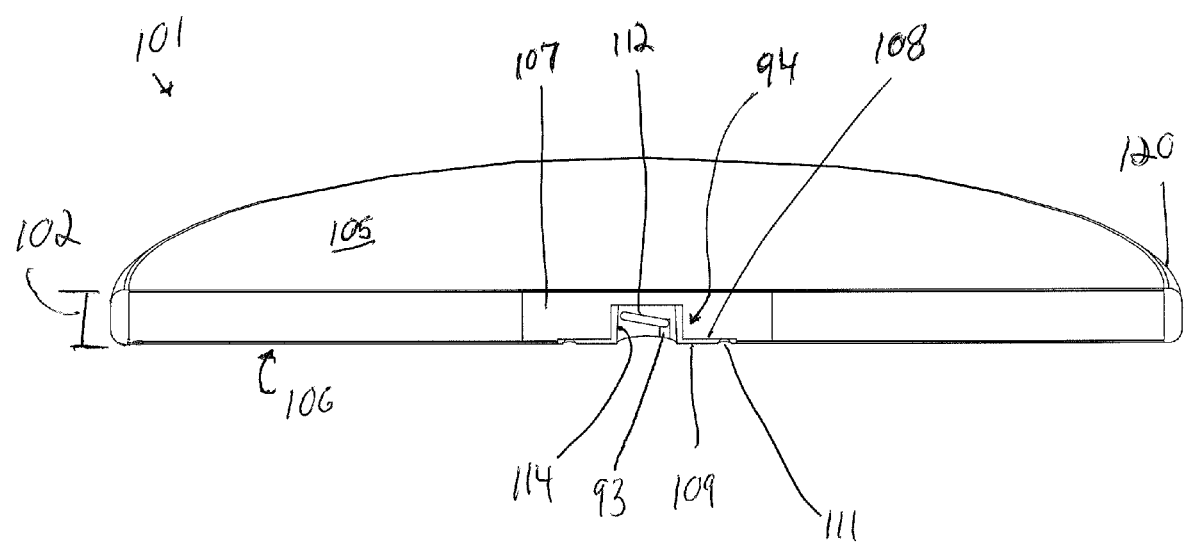
FIG. 29 is a cross-sectional view of a tabletop made in accordance with the current disclosure.
Figure 32:
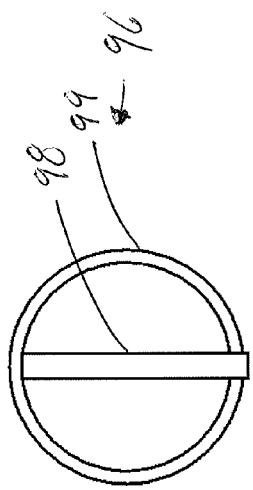
FIG. 32 is a top view of FIG. 30.
Figure 31:
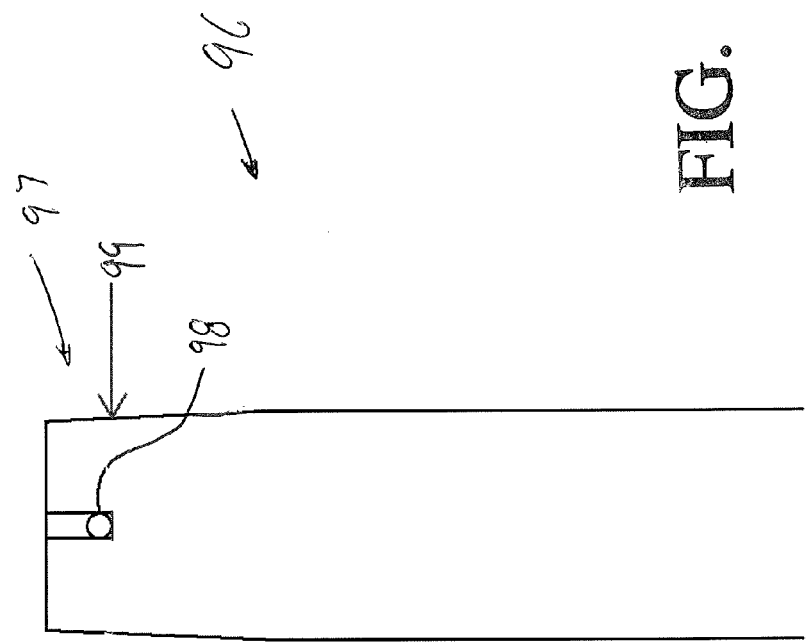
FIG. 31 is a front view of FIG. 30.
Figure 30:
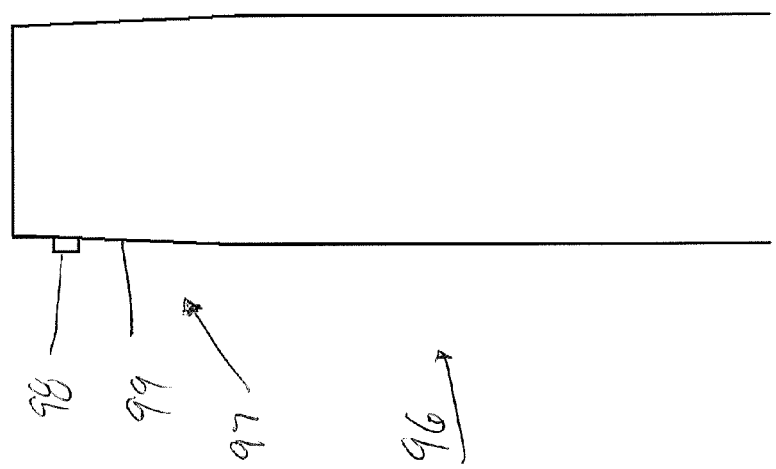
FIG. 30 is a partial side view of a column showing an example of an insert end.
Figure 33:
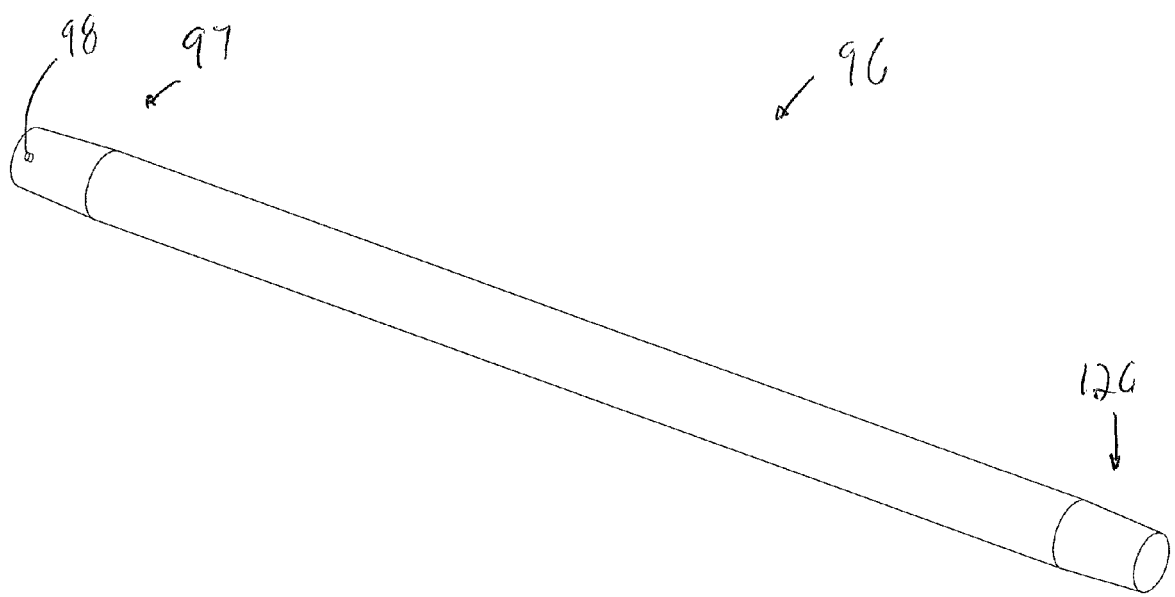
FIG. 33 is a perspective view of a column made in accordance with the current disclosure.
Figure 34:
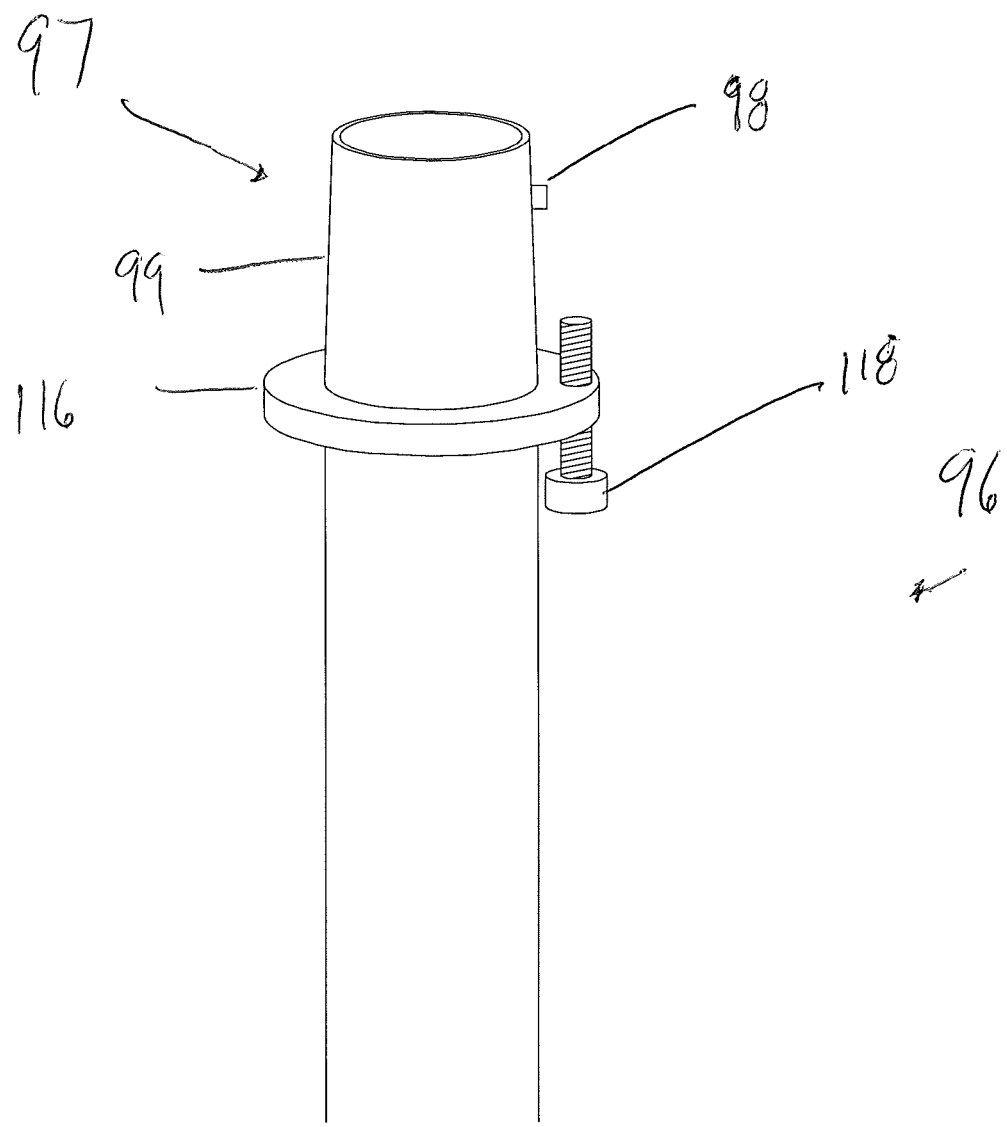
FIG. 34 is a partial view of a column showing a collar space from the insert end and having a secondary fastener according to the current disclosure.
Figure 35:
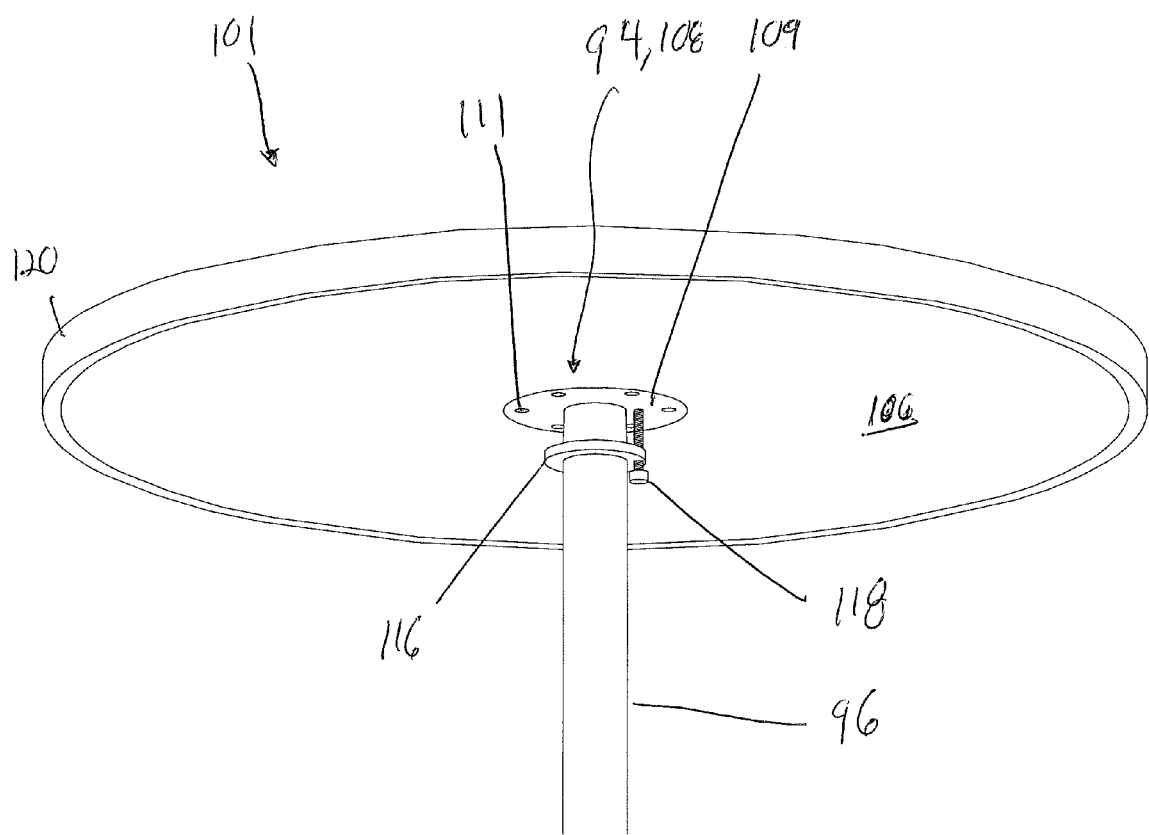
FIG. 35 shows a detailed view of interaction between a column and a tabletop wherein the column includes a collar and a secondary fastener.

Additionally, a table that uses a column support, such as a cocktail table rather than folding legs, can be made according to the current disclosure. For such a table, the planar surface 68 with core 12 can be constructed generally as described above. As seen in FIGS. 22A-C, a column connection 94, or column support 94, can be placed integral to the core 12 of the planar surface 68 during the construction process. The column support 94 is shaped to accept the column 96 and removably secure the column 96 within the column support 94. This can be accomplished numerous ways, including an interference fit between the column 96 and the column support 94, threads on the column 96 operating with threads in the opening 95 of the column support 94, push button connections, ball and seat, tongue and grove connections, etc.

As seen in FIGS. 23-34, an alternate table can be made in accordance with the current disclosure. This table 100 can include a tabletop 101 comprising a panel 10 made as previously described. The panel 10 can include a core 12, a thickness 102, a perimeter section 104, a top surface 105, and a bottom surface 106.

A column connection 94 is positioned in the core 12. Preferably, the column connection 94 is positioned completely within the thickness 102 of the panel 10. The column connection 94 can include a flange 108 and a cylindrical sleeve 110, which can be described as a body or receptacle. The cylindrical sleeve 110 can have a first fastener 112 positioned on the tapered inside 114 of the cylindrical sleeve 110. Preferably this first fastener 112 is a groove made into the tapered interior 114.

The column 96 can include an insertion end 97 that includes a second fastener 98, which is preferably a protrusion that is shaped to interact with the groove to secure the column 96 to the column connection 94. The insert end 97 preferably includes a tapered perimeter 99 shaped to removably fit within the cylindrical sleeve 110 and interact with the tapered interior 114 of the cylindrical sleeve 110. The first fastener 112 and second fastener 98 provide a mechanical connection between the column 96 and the column connection 94 and ultimately the planar surface 68, or tabletop 101.

Preferably the column connection 94 includes a channel 93 shaped to accept the protrusion 98 and guide the protrusion 98 to the groove 112 in the tapered interior 114 of the cylindrical sleeve 110. Alternately described, this channel 93 is positioned to provide a pathway for the protrusion to traverse the tapered interior 114 of the cylindrical sleeve 110 from the flange 108 to the groove 112.

In this embodiment, the column 96 can be connected to the tabletop 101 as follows. The tapered perimeter 99 of the insertion end 97 can be inserted into the cylindrical sleeve 110 of the column connection 94. The protrusion 98 is aligned with the channel 93 during this insertion. The channel 93 allows the protrusion 98 to traverse the opening in the flange and the tapered interior 114 of the cylindrical sleeve 110 until the protrusion 98 reaches the groove 112. At that point the column 96 can be turned, preferably clock-wise approximately a quarter of a turn, to allow the protrusion 98 to traverse the groove 112 and secure the column 96 in the column connection 94. Concurrently with this interaction between the protrusion 98 and the groove 112, the tapered perimeter 99 of the insertion end 97 engages the tapered interior 114 of the cylindrical sleeve 110 and establishes a frictional fit to further secure the column 96 in the column connection 94.

The column 96 can be removed by turning the column 96 in the opposite direction relative to the tabletop 101, preferably counter clock-wise, and moving the protrusion 98 along the groove 112 toward the channel 93. The protrusion can then be withdrawn from the groove 112 by traversing the channel 93 as the column is separated from the column connection 94 and ultimately the tabletop 101.

The flange 108 includes an exterior side 109 that can be flush with the bottom surface 106 of the panel 10 while the cylindrical sleeve 110 is positioned within the thickness 102 of the core 12. Alternately, the exterior side 109 the flange 108 can be described as being generally coplanar with the bottom surface 106 of the panel 10. Alternately, the entire column connection 94 can be sunk or positioned entirely within the thickness 102 of the panel 10, wherein the column connection 94 is positioned between the top surface 105 and the bottom surface 106 of the tabletop 101.

This positioning facilitates flat stacking of the tabletops 101 of multiple tables 100 once the column 96 is released from the column connection 94. Flat stacking can be described where the top surface 105 and the bottom surface 106 of adjacent tabletops 101 can touch once the tabletops 101 are stacked. The previously discussed flush, co-planar, or sunk alignment of the column connection 94 and the panel 10 facilitates stacking of the tabletops 101 in a stable manner and compact manner. Again, this is an improvement over conventional designs that have large extensions protruding from the bottom of their tabletop surfaces which greatly increases both the amount of area required to store those conventional tables once disassembled and the instability of the storage configuration.

The column 96 can also include a collar 116 that is spaced from the insertion end 97. The collar can be shaped and designed to substantially conform to the shape of the flange 108. A secondary fastener 118 can be positioned to engage the collar 116 and the flange 108 to further enhance the securement between the column 96 and the tabletop 68 through the column connection 94. One example of a secondary fastener is show frictionally engaging both the collar 116 and the flange 108. The secondary fastener can rotationally fix the relationship between the tabletop 101 and the column 96.

Also included is a frame 120 that is bonded to the perimeter section 104 of the core 12. Preferably this perimeter section 104 is generally flat and the frame 120 extends outward past the perimeter section 104. Preferably the frame 120 is a poured polyurethane elastomer having a generally half-moon, half-circular, or half-oval shape. The frame 120, which can also be described as an edge, can be mechanically bonded in the perimeter section 104 to be flush with the top and bottom surfaces of the panel 10 or core 12 and include a seamless exterior that projects outside the edge of the perimeter section 104 in an arcuate manner.

Also included is a base 122 having a column opening 124 that interacts with a base end 126 of the column 96. The base end 126 interacts with a column opening 124 to removably engage the base 122 to the column 96. Preferably this interaction is a frictional fit but other options, as known in the art, can be used. The column opening 124 and the base end 126 have corresponding tapered shapes to facilitate this frictional fit. The base 122 can have multiple designs including a generally "x" shaped option having four legs or a trumpet option having a generally conical shape.

The tabletop 100 can be made generally as follows. A core 12 can be formed, preferably of honeycomb type material, as previously described. A cavity can then be cut in the core 12 into which an insert 107, preferably having the same thickness as the honeycomb and preferably made of wood but can be composed of other materials, is inserted. Various layers and skins can then be applied as previously described. During the curing process the fiber layers, such as fiber layers 16 and 18, and polyurethane layers, such as polyurethane layers 20 and 22, harden to form a solid surface around the core 12 and insert 107. The insert 107 can then become a solid integral part of the core 12. The panel is removed from the press and cut to the size and shape for a tabletop 101. Another cavity can be machined into the insert 107 through the polyurethane layer 22 and skin 16. This cavity can substantially mirror the shape of the column connection 94, including the cylindrical sleeve 110 and flange 108. The column connection 94 can then be inserted into this cavity and affixed to the insert 107, For example, openings 111 in the flange 108 can accept fasteners, such as screws and the like, that engage the insert 107 to secure the column connection 94 to the insert 107. This then forms the previously discussed flush, co-planar, or sunk alignment of the column connection 94 and the panel 10. This is in contrast to typical prior art tables that have the connection for a column support protruding from the exterior surface of the table. The inventive connection allows the tables to be securely and compactly stacked.

As best seen in FIGS. 18A-21C, the table 64, or the table 100, can include a contoured edge 80 that cooperates with a frame, such as a cap 82, to provide a durable, yet light weight perimeter for the table 64. The contoured edge 80, which can be described as a pinched edge 80, is preferably formed as part of the perimeter of the core 12, fiber layers 16 and 18, and polyurethane layers 20 and 22. The contoured edge 80 includes a reduced thickness portion 84 that is smaller than the combined thickness of the core 12, fiber layers 16 and 18, and polyurethane layers 20 and 22. An intermediate thickness portion 86 extends from the reduced thickness portion 84 opposite the body portion of the core 12. The contoured edge 80 can be described as having a neck and a head extending from the neck. Alternate shapes are possible for the contoured edge 80 with an important characteristic being the facilitation of the mechanical attachment between the core and the cap 82. For example, a cross-section of the contoured edge 80 can generally look "T-shaped", as shown in the figures.

The cap 82 can include a concave shape designed to accept and hold the contoured edge 80. The cap can include projections 90 having extensions 92, or teeth 92, that can collectively form the concave shape. The cap 82 can include a rounded top 88 and is preferably composed of cast urethane material, but alternate suitable materials can be used. Skins 24 and 26 can be applied as previously discussed, but preferably before the addition of the cap 82 to the table 64.

The perimeter for the table 64 can be formed by using a press that will form the pinched edge 80 by squeezing the composite material, comprised of the core 12, fiber layers 16 and 18, and polyurethane layers 20 and 22, together. When the press closes, impressions from protrusions in the two halves of the press are forced into the composite material around the perimeter of the core. The resulting pinched edge 80 becomes a solid shape around the perimeter and provides a mechanical lock for the cap 82. Additionally, the cap 82 can be glued to the pinched edge core 80 for a reinforced attachment.

The combination of the pinched edge core 80 and the cap 82 provides improved impact resistance for the corners and edges of the table 64. The resulting perimeter of the table 64 is solid, impact resistant to repeated drops, smooth, aesthetically pleasing, and connected to the panel portion of the table 64 in a way that it will not peel away.

Since the fiber layers 16 and 18 and polyurethane layers 20 and 22 harden to form a solid surface around the contoured edge 80, forces against the cap 82 are deflected and absorbed. Typical prior art composite honeycomb panels do not have a perimeter, or edge, designed for severe impact and have only a wrap around edge. The core of those prior art composite honeycomb panels are typically made of paper, aluminum or polypropylene and in of themselves do not provide any impact resistance. Nor do the skins of those prior art tables provide any impact resistance. Other manufacturers of composite panels rely on the edge material itself for impact resistance. Initial test on the inventive contoured edge 80 and cap 82 design confirmed that a panel made with this process can withstand impact drops. For example, tests showed that an inventive panel when dropped on its edge withstood over seven (7) direct corner impacts from a twenty-four (24) inch high drop without failure with a panel weighing under fifty pounds (in the test the panel weighed 42 pounds). This is a huge advantage over any other panels using a honeycomb type core.

Another benefit of the inventive contoured edge 80 and cap 82 design is in the manufacturing process itself. Previously, when a cast urethane edge was poured around panels made with a straight honeycomb edge, a seal, such as tape, had be placed all around the perimeter to avoid any openings where air could be entrained into the cast urethane, thus weakening the cast urethane. Also, typically honeycomb panel edges are inconsistent. As such, previously when there were openings or uneven surface edges on the honeycomb panels, excess urethane was used, and wasted, or the machine shot time was off and scrap material was produced. This increased the manufacturing time and cost of making a honeycomb panel with a urethane edge. With the inventive pinched edge 80, the tape process is generally eliminated and a consistent molded edge is realized.

Thus, although there have been described particular embodiments of the present disclosure showing a new and useful New Portable Table Construction and Method for Making the Same, it is not intended that such references be construed as limitations upon the scope of this invention except as set forth in the following claims.

What is claimed is:

1. A portable table, the portable table comprising
a tabletop including a core, a length, a width, a thickness, a perimeter section, a top surface, and a bottom surface;
at least one column connection positioned in the core and being fully encompassed within the thickness of the tabletop as measured from the top surface to the bottom surface; and
at least one column including an insertion end shaped to removably fit within the column connection.

2. The table of claim 1, further including a frame bonded to the perimeter section of the core and extending past the perimeter section of the core.

3. The table of claim 1, wherein the column connection includes a flange and a cylindrical sleeve having a groove, and the insertion end includes a protrusion shaped to removably engage the groove and secure the column to the column connection.

4. The table of claim 3, the column connection further including a channel shaped to accept the protrusion and allow the protrusion to enter the groove.

5. The table of claim 3, the column further including a collar spaced from the insertion end, the collar shaped to match the flange.

6. The table of claim 1, further including a base having a column opening and the column further including a base end shaped to removably engage the column opening.

7. The table of claim 1, wherein the column connection includes a flange having an exterior side positioned flush with the bottom surface of the tabletop and the cylindrical sleeve extends away from the flange and into the thickness of the tabletop.

8. The table of claim 1, the core further including a first side and a second side and at least one layer of material positioned on each side.

9. A portable table, the portable table comprising
a tabletop including a core, a length, a width, a thickness, a perimeter section, a top surface, and a bottom surface;
at least one column connection including a flange extending radially from a cylindrical sleeve, the flange including an exterior surface positioned opposite the cylindrical sleeve, the cylindrical sleeve having a tapered interior defining an aperture, an outside, and a first fastener positioned on the tapered interior, the exterior surface of the flange positioned co-planar to the bottom surface of the tabletop and cylindrical sleeve positioned within the thickness of the tabletop;
at least one column including an insertion end, the insertion end including a second fastener shaped to removably engage the first fastener and secure the column to the column connection, the insertion end including a tapered perimeter shaped to removably fit within the cylindrical sleeve of the column connection; and an edge bonded to the perimeter section of the tabletop.

10. The table of claim 9, further including a base having a column opening and the column further including a base end shaped to removably engage the column opening.

11. The table of claim 9, the column further including a collar spaced from the insertion end and extending outside the cylindrical sleeve of the column connection, the collar shaped to match the flange.

12. The table of claim 9, wherein the first fastener is a groove and the second fastener is a protrusion shaped to engage the groove.

13. The table of claim 12, the column connection further including a channel shaped to accept the protrusion and allow the protrusion to enter the groove.

14. The table of claim 9, the core further including a first side and a second side and at least one layer of material positioned on each side.

15. A portable table, the portable table comprising
- a tabletop including a core, a length, a width, a thickness, a perimeter section, a top surface and a bottom surface;
- at least one column connection including a flange extending radially from a cylindrical sleeve, the cylindrical sleeve having a tapered interior defining an aperture, a groove positioned on the tapered interior, and a channel extending along the tapered interior from the flange to the groove, the at least one column connection being fully encompassed within the thickness of the tabletop as measured from the top surface to the bottom surface;
- at least one column including an insertion end, an inwardly tapering perimeter shaped to removably fit within the tapered interior of the cylindrical sleeve, and a collar spaced from the insertion end and extending radially outward, the insertion end being fully encompassed within the thickness of the tabletop when within the tapered interior of the cylindrical sleeve and including a protuberance shaped to enter the channel and removably engage the groove, the collar shaped to match the flange;
- a secondary fastener shaped to rotationally fix the flange with respect to the collar;
- an edge bonded to the perimeter section and extending from perimeter section of the tabletop; and
- wherein the channel is shaped to accept the protrusion and allow the protrusion to traverse at least a portion of the tapered interior and enter the groove.

16. The table of claim 15, further including a base having a column opening and the column further including a base end shaped to removably engage the column opening.

17. The table of claim 16, the core further including a first side and a second side and at least one layer and positioned on each side.

* * * * *